United States Patent
Lindquist et al.

(10) Patent No.: US 12,449,435 B2
(45) Date of Patent: Oct. 21, 2025

(54) METHODS AND SYSTEMS FOR PICKING AND PLACING VESSELS AND FOR ALIGNING AN INSTRUMENT

(71) Applicant: Beckman Coulter, Inc., Brea, CA (US)

(72) Inventors: Jon Lindquist, Coon Rapids, MN (US); Kevin Nowak, Waconia, MN (US); John Moyer, Delano, MN (US); Creigh Thompson, Chaska, MN (US); Steven Alseth, Cologne, MN (US); Nicholas Hofmann, Waconia, MN (US); Robert Torney, Chanhassen, MN (US); Vladimir Goldman, Bloomington, MN (US)

(73) Assignee: Beckman Coulter, Inc., Brea, CA (US)

( * ) Notice: Subject to any disclaimer, the term of this patent is extended or adjusted under 35 U.S.C. 154(b) by 922 days.

(21) Appl. No.: 17/358,830

(22) Filed: Jun. 25, 2021

(65) Prior Publication Data
US 2021/0396773 A1    Dec. 23, 2021

Related U.S. Application Data

(63) Continuation of application No. PCT/US2019/068809, filed on Dec. 27, 2019.
(Continued)

(51) Int. Cl.
*G01N 35/00* (2006.01)
*G01N 25/04* (2006.01)
*G01N 35/04* (2006.01)

(52) U.S. Cl.
CPC ......... *G01N 35/0099* (2013.01); *G01N 35/04* (2013.01); *G01N 2035/0406* (2013.01); *G01N 2035/0493* (2013.01)

(58) Field of Classification Search
CPC ............... G01N 35/0099; G01N 35/04; G01N 2035/0406; G01N 2035/0493
See application file for complete search history.

(56) References Cited

U.S. PATENT DOCUMENTS

| | | |
|---|---|---|
| 4,705,311 A | 11/1987 | Ragard |
| 5,775,755 A | 7/1998 | Covert et al. |

(Continued)

FOREIGN PATENT DOCUMENTS

| | | | | |
|---|---|---|---|---|
| EP | 1179369 A2 * | 2/2002 | ............ | B01L 3/0227 |
| EP | 2100150 B1 | 9/2009 | | |

(Continued)

OTHER PUBLICATIONS

Zhang et al. "Search Plan of Search Plane." Feb. 2015 (Year: 2015).*

(Continued)

*Primary Examiner* — Jill A Warden
*Assistant Examiner* — Michael Stanley Gzybowski

(57) ABSTRACT

A gripper assembly (20) includes a cylinder (22), a deformable gripping portion (210), a piston (24), and an ejector (260). The gripper assembly is suitable for picking and placing a vessel (10) by gripping a gripped portion (102) of the vessel. The gripping portion extends from adjacent an end of the cylinder. The gripping portion has a spring-like property that allows deformation as the vessel is engaged thereby holding the vessel. The piston is slidably disposed inside the cylinder. The ejector includes a head portion (270) adjacent a first end of the ejector and a plunger portion (26) adjacent a second end of the ejector. The head portion of the ejector is slidably disposed inside the cylinder separately from the piston. The plunger of the ejector is partially disposed within the deformable gripping portion for engaging the vessel.

(Continued)

The gripper assembly may be used to align an analyzer instrument (800).

20 Claims, 17 Drawing Sheets

Related U.S. Application Data

(60) Provisional application No. 62/786,112, filed on Dec. 28, 2018.

(56) References Cited

U.S. PATENT DOCUMENTS

| | | | |
|---|---|---|---|
| 7,128,874 | B2 | 10/2006 | Kittock et al. |
| 7,855,077 | B2 | 12/2010 | Wilson |
| 8,267,451 | B2 | 9/2012 | Pedrazzini |
| 8,801,723 | B2 | 8/2014 | Shah et al. |
| 9,519,000 | B2 | 12/2016 | Wilson et al. |
| 9,528,917 | B2 | 12/2016 | Knight |
| 2005/0283274 | A1* | 12/2005 | Kleinschmitt ..... G01N 35/0099 700/254 |
| 2011/0150724 | A1 | 6/2011 | Furle et al. |
| 2013/0209210 | A1 | 8/2013 | Nuotio |
| 2014/0100694 | A1 | 4/2014 | Rueckl et al. |
| 2014/0267713 | A1* | 9/2014 | Basque ..................... G01N 1/08 901/47 |
| 2017/0028561 | A1 | 2/2017 | Yamada et al. |
| 2017/0292294 | A1* | 10/2017 | Brennan ............... E05B 65/108 |

FOREIGN PATENT DOCUMENTS

| | | |
|---|---|---|
| EP | 2286246 B1 | 2/2011 |
| JP | 2012/254524 | 12/2012 |
| WO | WO 02/072318 | 9/2002 |
| WO | WO 02/072318 A1 | 9/2002 |

OTHER PUBLICATIONS

Morgan et al. ("A Low-cost Compliant 7-DOF Robotic Manipulator," (2011 IEEE International Conference on Robotics and Automation, Shanghai International Conference Center, May 9-13, 2011, Shanghai, China) (Year: 2011).*

Extended European Search Report dated Aug. 30, 2022 for Application No. 19905258.0, 11 pages.

Bal-tec, All Probe Characterization Spheres, dated Dec. 29, 2017, and downloaded from http://web.archive.org/web/20171229105221/http://www.precisionballs.com/All_Characterization_Spheres.php, on Sep. 7, 2021, 35 pgs.

Industrial Products Finder (IPF), Precision Balls/Tooling Balls/Reference Spheres, dated Feb. 7, 2014, and downloaded from http://web.archive.org/web/20140207061640/http://www.ipfonline.com/products/index/precision_ballstooling_ballsreference_spheres_1, on Sep. 7, 2021, 1 pg.

International Search Report and Written Opinion dated May 1, 2020 for Application No. PCT/US2019/068809, 10 pgs.

* cited by examiner

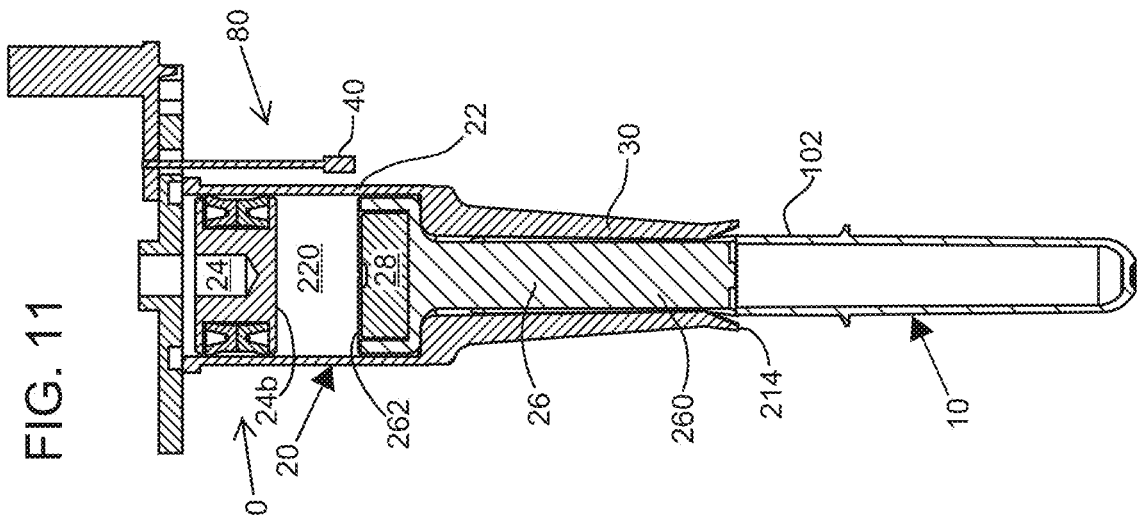
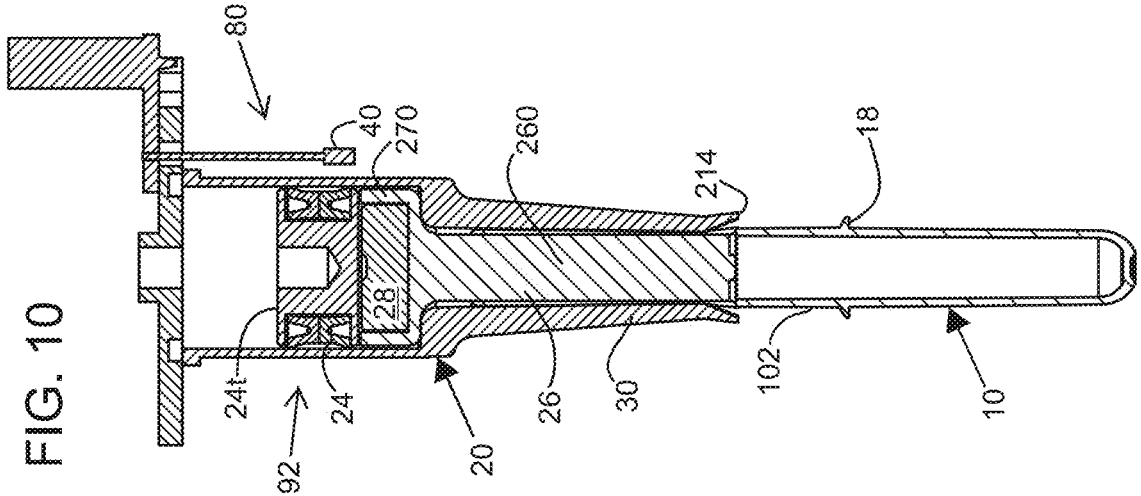
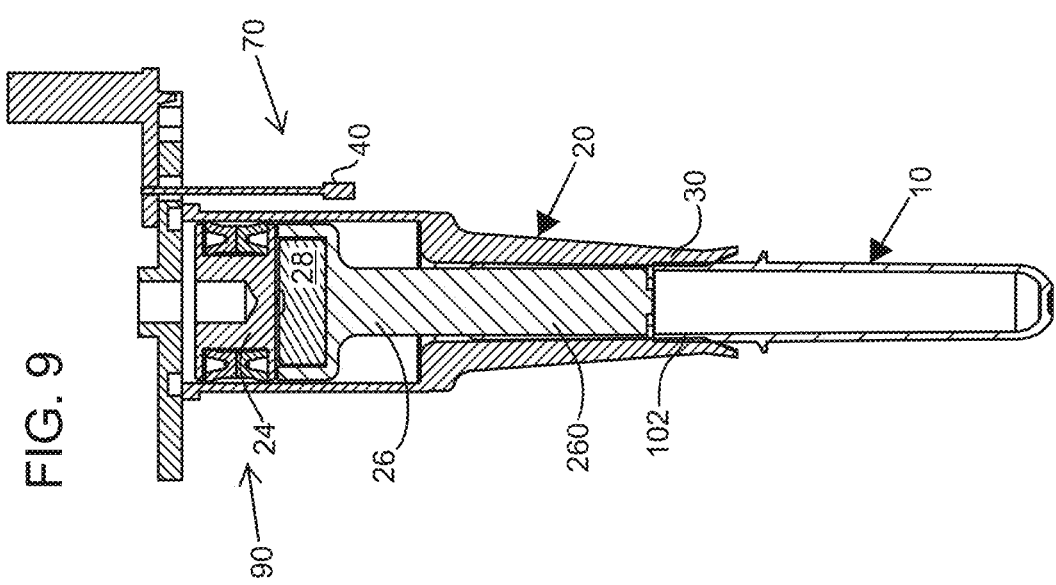

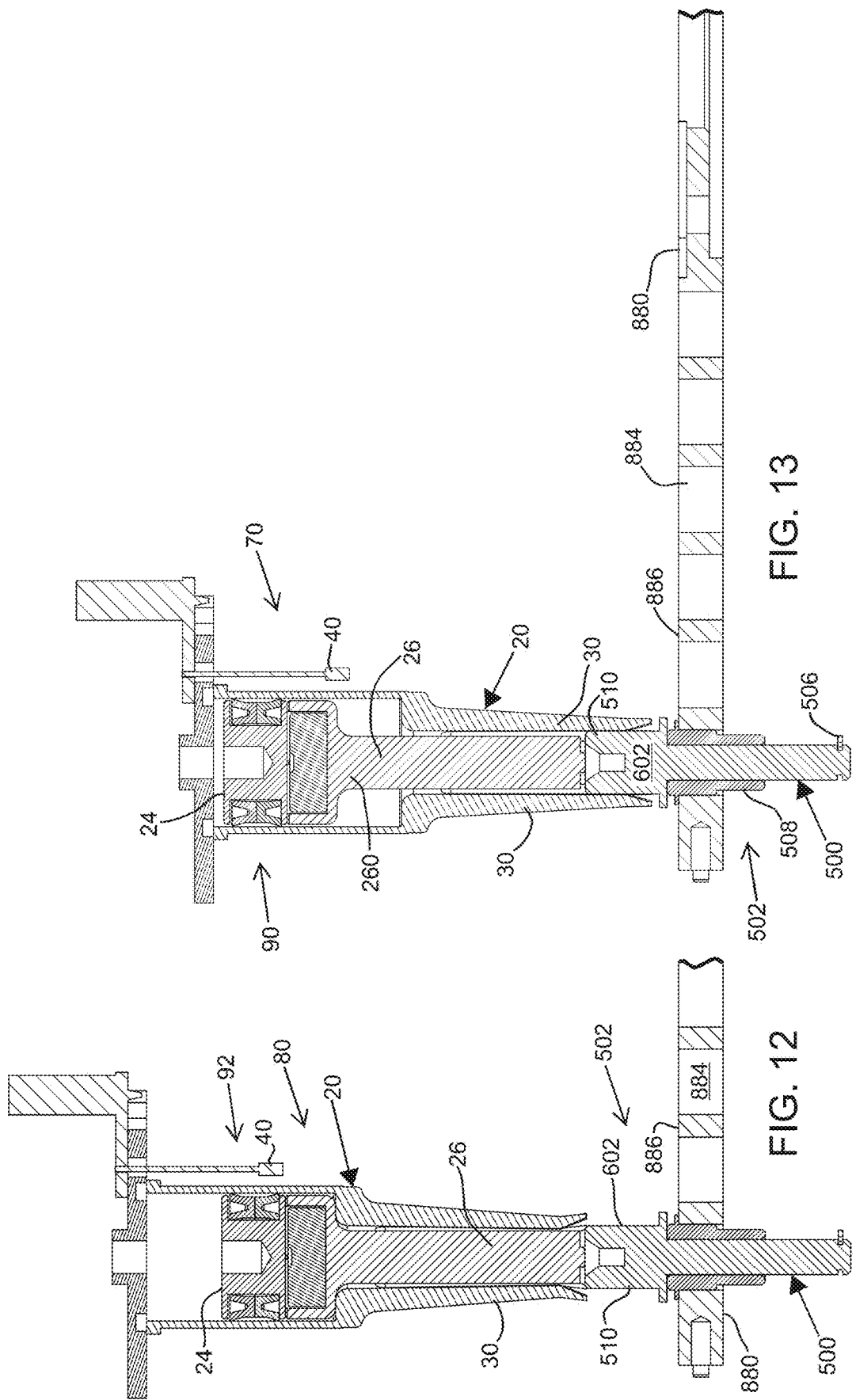

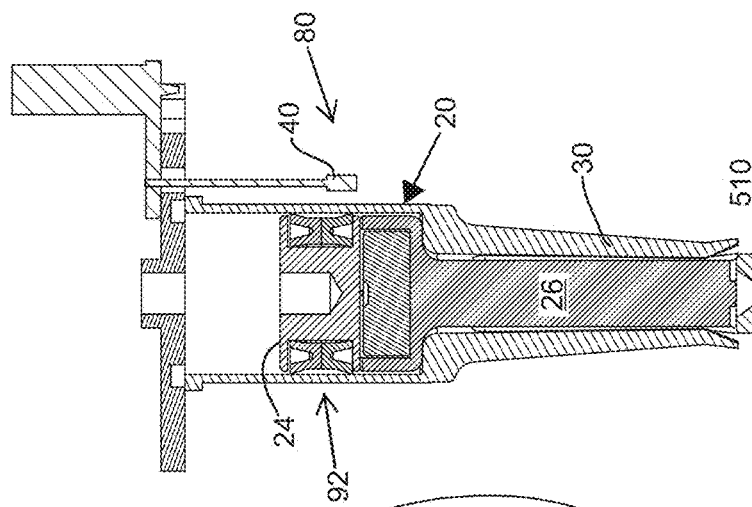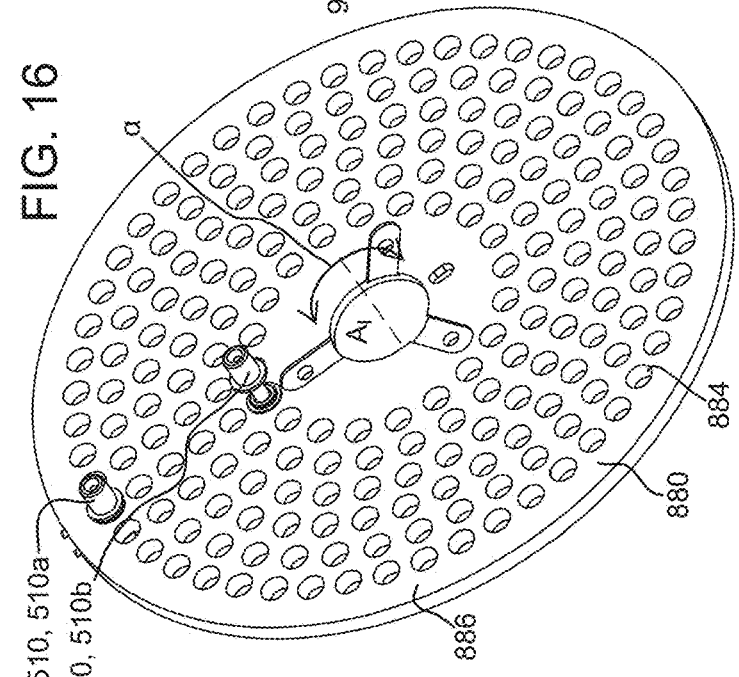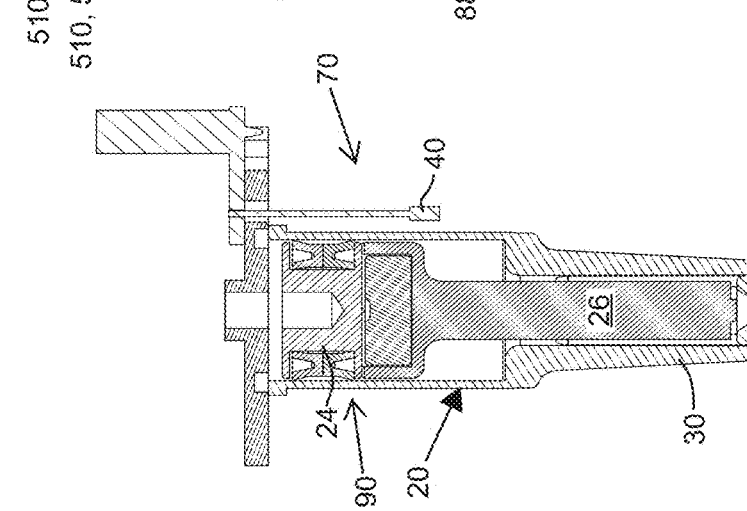

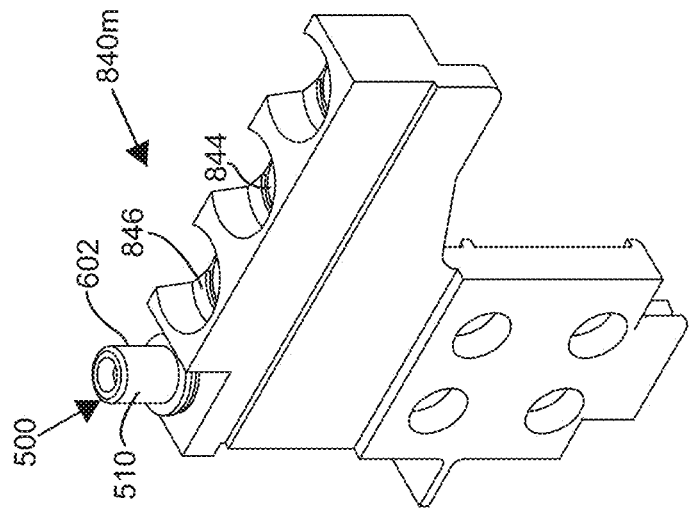
FIG. 19
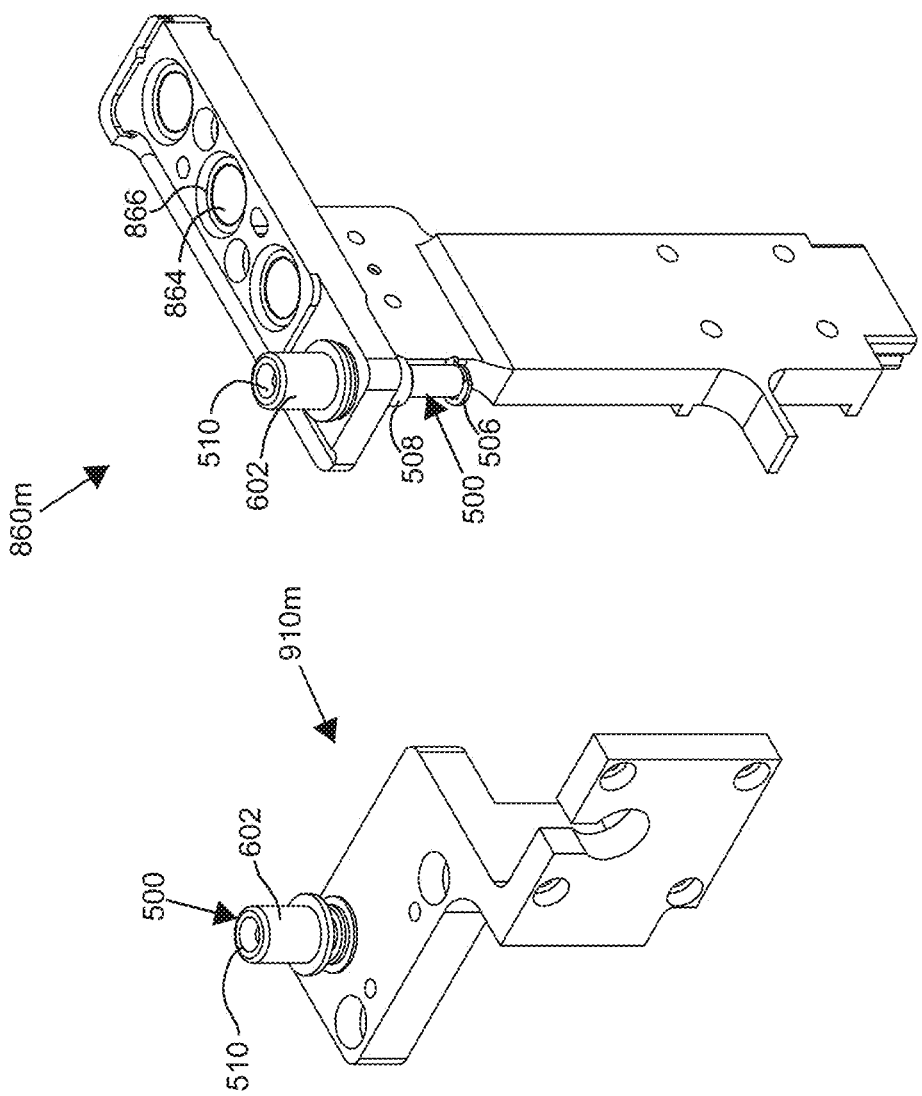
FIG. 18
FIG. 17

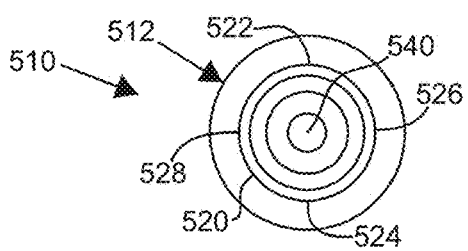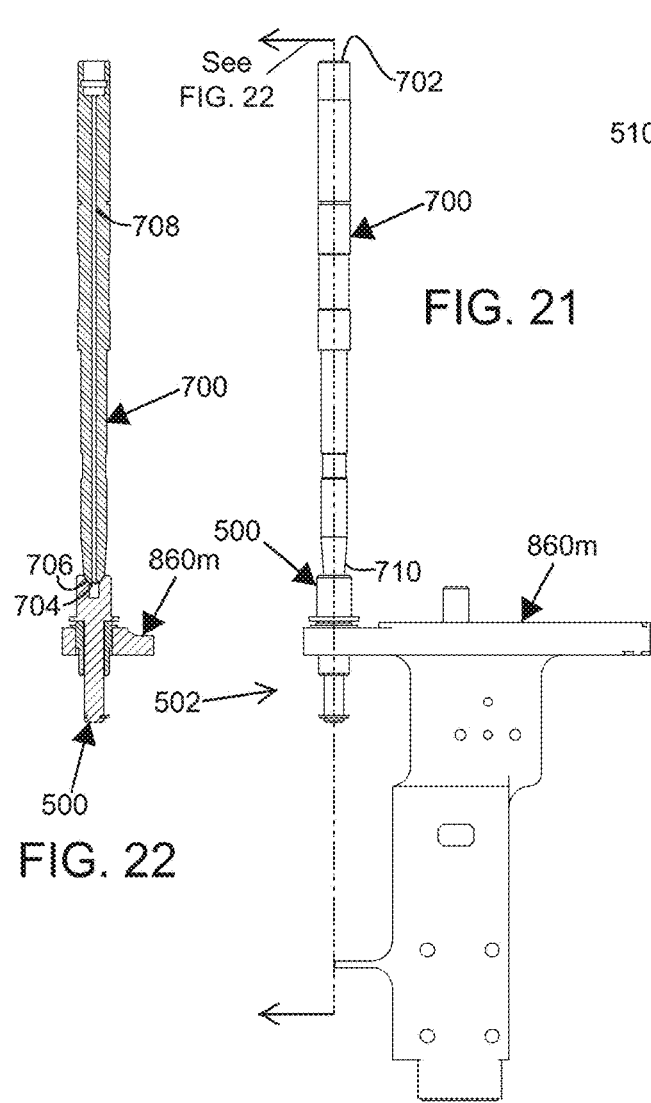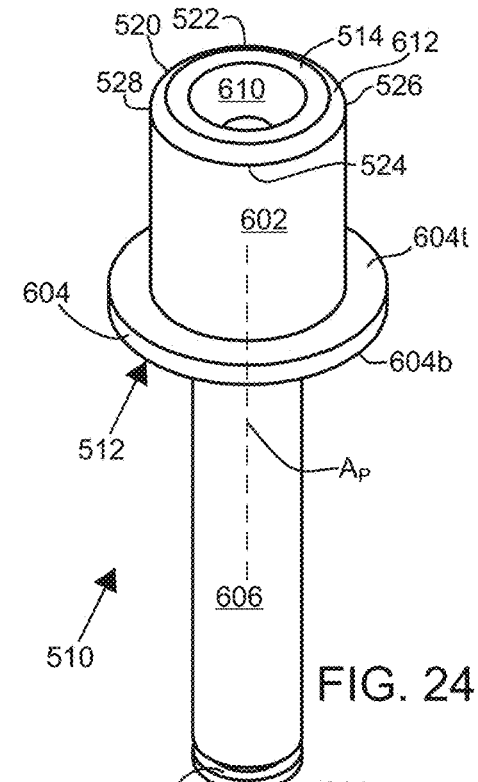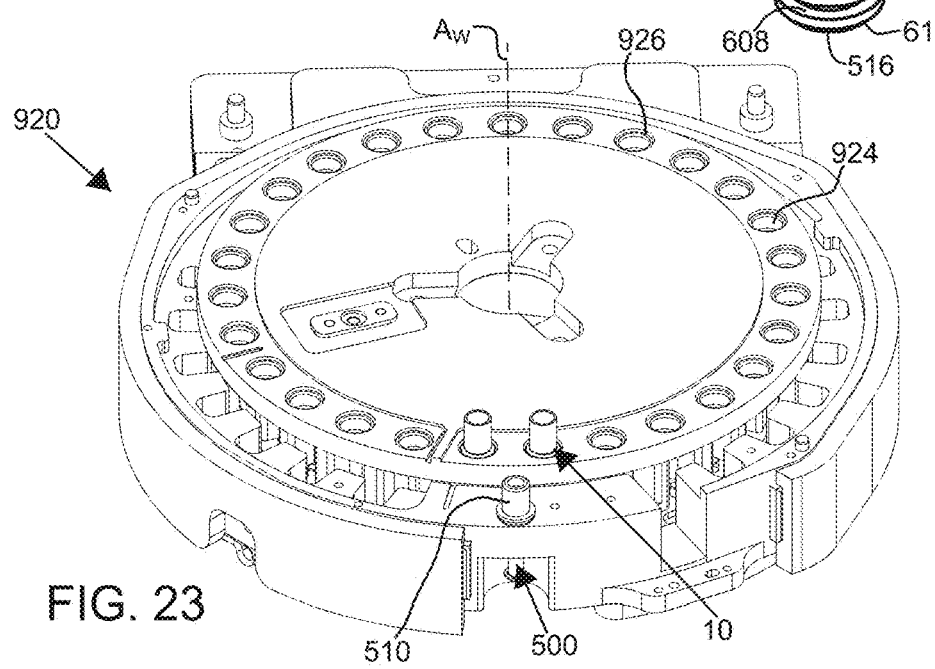

METHODS AND SYSTEMS FOR PICKING AND PLACING VESSELS AND FOR ALIGNING AN INSTRUMENT

RELATED APPLICATIONS

This application is a continuation of International Application Number PCT/US19/68809, titled "Methods and Systems for Picking and Placing Vessels and for Aligning an Instrument," filed in the United States Patent Office on Dec. 27, 2019, which is related to, and claims the benefit of, provisional patent application 62/786,112, titled "Methods and Systems for Picking and Placing Vessels and for Aligning an Instrument", filed in the United States Patent Office on Dec. 28, 2018. Those applications are hereby incorporated by reference in their entirety.

BACKGROUND

The present disclosure relates generally to vessel handling methods and systems used in conjunction with automated chemical analyzer instruments and, more specifically, to methods and systems for picking and placing vessels used in conjunction with automated chemical analyzer instruments. The present disclosure also relates generally to aligning various subsystems within an automated chemical analyzer instrument. Automated chemical analyzer instruments include immunodiagnostic instruments. Such instruments may be used in clinical sampling and analyzing applications. Such instruments often involve the handling of vessels for performing various assays. The basic functions of handling vessels typically involve picking, transferring, and placing the vessels, and mixing their contents for processing and analyzing by an automated analyzer. During the transfer process, the vessels and its contents must be moved smoothly. Jarring the vessel may cause the contents to splash out of the vessel and/or may cause droplets to stick to the walls of the vessel.

One of the disadvantages of conventional vessel picking and placing devices used in conjunction with automated analyzers is that they lack detection capability should the vessel become disengaged and fall away from the pick and place unit.

One of the disadvantages of many conventional automated analyzers is that they lack the ability to perform an autonomous alignment process to align the various subsystems. Conventional automated analyzers may lack an ability to internally diagnose misalignment between the various subsystems.

SUMMARY

One aspect of the present disclosure includes a gripper assembly with a cylinder, a deformable gripping portion, a piston, and an ejector. The gripper assembly may be suitable for picking and placing a vessel by gripping a gripped portion of the vessel. The cylinder may extend between a first end and a second end. The deformable gripping portion may extend from adjacent the second end of the cylinder. The deformable gripping portion may have a spring-like property that allows deformation as the gripped portion of the vessel is engaged with the deformable gripping portion, thereby allowing the deformable gripping portion to hold the vessel by friction. The piston may be slidably disposed inside the cylinder. The ejector may extend between a first end and a second end. The ejector may include a head portion that is adjacent the first end of the ejector and further include a plunger portion that is adjacent the second end of the ejector. The head portion of the ejector may be slidably disposed inside the cylinder separately from the piston. The plunger portion of the ejector may be disposed at least partially within the deformable gripping portion for engaging the vessel.

In certain embodiments, the cylinder of the gripper assembly includes an internal surface with a circular cross-section. The gripper assembly may further include an end rim. The end rim may join the second end of the cylinder and the first end of the deformable gripping portion. In certain embodiments, a first end of the deformable gripping portion of the gripper assembly is adjacent the second end of the cylinder, and a second end of the deformable gripping portion includes a chamfer for receiving the vessel. The deformable gripping portion may include at least two gripping members extending from adjacent the second end of the cylinder in a spaced-apart relationship. The deformation may allow deflection of the at least two gripping members when the vessel is inserted therebetween thereby engaging the gripped portion of the vessel with the deformable gripping portion. At least one of the at least two gripping members may be made of a semi-rigid flexible material. In certain embodiments, the cylinder and the deformable gripping portion may be included in a single monolithic piece. The single monolithic piece may be made of plastic material. In certain embodiments, the gripper assembly further includes an adapter for mounting the gripper assembly to a positioning mechanism. In certain embodiments, the gripper assembly further includes a pneumatic system for actuating the piston to push the ejector for releasing the vessel from the deformable gripping portion. The pneumatic system may actuate the piston by supplying pressurized air into the cylinder. In certain embodiments, the gripper assembly further includes a sensor system for detecting whether the ejector is at a vessel present position or a vessel absent position. In certain embodiments, the spring-like property of the deformable gripping portion further allows deformation as a gripped portion of an alignment pin is engaged with the deformable gripping portion thereby allowing the deformable gripping portion to hold the alignment pin by friction. In certain embodiments, the spring-like property of the deformable gripping portion further allows deformation as a gripped portion of an alignment pin is engaged with the deformable gripping portion thereby allowing the deformable gripping portion to hold the alignment pin by friction. The sensor system may further detect whether the ejector is at a pin present position or a pin absent position.

Certain aspects of the present disclosure include a method of aligning a pick and place unit with a target. The method may include providing the pick and place unit with a gripper, moving the gripper toward a first predetermined position with at least a first actuator, monitoring the first actuator for stalling while moving the gripper toward the first predetermined position, determining a first stalled position of the gripper when the first actuator stalls, and determining if a presence of the target was detected or not detected by analyzing the first stalled position of the gripper.

Certain aspects of the present disclosure include the gripper having a collet and the target having a pin. The collet may be configured to hold the pin by friction when the collet engages the pin and the first actuator moves the collet and thereby moves the pin to a second predetermined position. In certain embodiments, the first actuator may include a stepper motor and monitoring the first actuator for stalling may include detecting a step difference between an encoder and a commanded position of the stepper motor.

In certain embodiments of the present disclosure, if the presence of the target was not detected, then the gripper is moved toward a third predetermined position with at least the first actuator and a second actuator. The first actuator may be monitored for stalling while moving the gripper toward the third predetermined position. A second stalled position of the gripper may be determined when the first actuator stalls. Determining if the presence of the target was detected or not detected by analyzing the second stalled position of the gripper may be further included in the method.

In certain embodiments of the present disclosure, the method may further include repeating the steps of the previous paragraph if the presence of the target was not detected. The gripper may be moved toward a subsequent predetermined position or positions and subsequent stalled positions may be determined until the presence of the target is detected.

In certain embodiments of the present disclosure, grid hunting is included when repeating the steps of the previous two paragraphs. Grid hunting may include moving the gripper toward the subsequent predetermined positions with at least the first actuator, the second actuator, and a third actuator. In certain embodiments, the first actuator and the second actuator actuate the pick and place unit. In certain embodiments, the third actuator actuates the target.

In certain embodiments of the present disclosure, edges of the target are determined upon detecting the presence of the target. Determining the edges of the target may include moving the gripper in an engaging direction and in an opposite disengaging direction with the first actuator while incrementing positions of the gripper about the target with at least a second actuator and thereby determining at least a first edge portion and a second edge portion that are opposite each other about the target. The first actuator may be monitored for stalling while moving the gripper in the engaging direction. Determining the edges of the target may further include incrementing positions of the gripper about the target with at least the second actuator and a third actuator and thereby determining at least a third edge portion and a fourth edge portion that are opposite each other about the target. The first edge portion and the second edge portion may be opposite about the target along a first direction, and the third edge portion and the fourth edge portion may be opposite each other about the target along a second direction. The first direction and the second direction may be orthogonal to each other.

In certain embodiments of the present disclosure, a center of the target is calculated by analyzing the opposite edge portions. In certain embodiments, the gripper may be moved into alignment with the center of the target. The gripper and the target may be engaged by positioning the gripper over the target and thereby holding the target with the gripper by friction. Moving the target with the gripper may be attempted. If the attempt to move the target with the gripper is not successful, then moving the gripper into alignment with the center of the target with grid hunting may be repeated. Engaging the gripper and the target by positioning the gripper over the target and thereby holding the target with the gripper by friction may be repeated. Attempting to move the target with the gripper may be repeated.

In certain embodiments of the present disclosure, stored coordinates of the first predetermined position corresponding to the target and/or the target may be retrieved from a storage location for use in moving the gripper toward the first predetermined position. Upon confirming alignment of the pick and place unit and the target, a current position of the target may be calculated. Upon the current position of the target being different from a former position of the target indicated by the retrieved stored coordinates, the current coordinates of the target and/or updated coordinates corresponding to the first predetermined position may be stored to the storage location for next use in moving the gripper toward the first predetermined position.

The target may be a first target of a plurality of targets. The above methods may include moving the gripper toward a predetermined position corresponding to a second target of the plurality of targets with at least the first actuator, monitoring the first actuator for stalling while moving the gripper toward the predetermined position corresponding to the second target, determining a stalled position of the gripper corresponding to the second target when the first actuator stalls, and determining if a presence of the second target was detected or not detecting by analyzing the stalled position of the gripper corresponding to the second target. Upon detecting the presence of the second target, edges of the second target may be determined. The first target and the second target may be a pair of targets on a common body. The method may further include determining a rotational orientation of the common body by analyzing the pair of targets.

BRIEF DESCRIPTION OF THE DRAWINGS

The above-mentioned and other features of this disclosure and the manner of obtaining them will become more apparent, and will be best understood by reference to the following description, taken in conjunction with the accompanying drawings. These drawings depict only typical embodiments of the disclosure and do not therefore limit its scope. They serve to add specificity and detail, in which:

FIG. 9 is a cross-sectional elevation view of the picking and placing gripper of FIG. 3, illustrated holding the prior art vessel of FIG. 1, according to the principles of the present disclosure;

FIG. 10 is the cross-sectional elevation view of FIG. 9, but with the prior art vessel being ejected from the picking and placing gripper, according to the principles of the present disclosure;

FIG. 11 is the cross-sectional elevation view of FIG. 9, but with the prior art vessel slipping out from the picking and placing gripper without being ejected from the picking and placing gripper, according to the principles of the present disclosure;

FIG. 12 is a partial cross-sectional elevation view of the picking and placing gripper of FIG. 3 positioned over a target of the component of FIG. 2, according to the principles of the present disclosure;

FIG. 13 is the partial cross-sectional elevation view of FIG. 12, but with the picking and placing gripper engaging the target, according to the principles of the present disclosure, and with more of the component of FIG. 2 shown;

FIG. 14 is similar to the partial cross-sectional elevation view of FIG. 13, but with the picking and placing gripper raising a similar but different target of the component of FIG. 2, according to the principles of the present disclosure, and with a different portion of the component of FIG. 2 shown;

FIG. 15 is the partial cross-sectional elevation view of FIG. 14, but with the picking and placing gripper rising further and thereby disengaging the target, according to the principles of the present disclosure, and with more of the component of FIG. 2 shown;

FIG. 16 is a perspective view of the component of FIG. 2 illustrated with a pair of the targets of FIGS. 12 and 14, according to the principles of the present disclosure;

FIG. 17 is a perspective view of a mount with a single target, according to the principles of the present disclosure;

FIG. 18 is a perspective view of another mount with a single target, according to the principles of the present disclosure;

FIG. 19 is a perspective view of still another mount with a single target, according to the principles of the present disclosure;

FIG. 21 is an elevation view of the mount and the target of FIG. 18 with a probe of an instrument interfacing with the target, according to the principles of the present disclosure;

FIG. 22 is a cross-sectional elevation view of the probe, the target, and the mount of FIG. 21, as called out at FIG. 21;

FIG. 23 is a perspective view of another component of an instrument with a single target, according to the principles of the present disclosure;

FIG. 24 is a perspective view of a target typical of the targets of FIGS. 12-23, according to the principles of the present disclosure;

FIG. 25 is a top plan view of the target of FIG. 24;

DETAILED DESCRIPTION

The present disclosure is directed to a new method and system for picking and placing vessels used in conjunction with an automated analyzer. The present disclosure is further directed to new methods and systems for aligning various subsystems of an automated analyzer.

Figure 1:
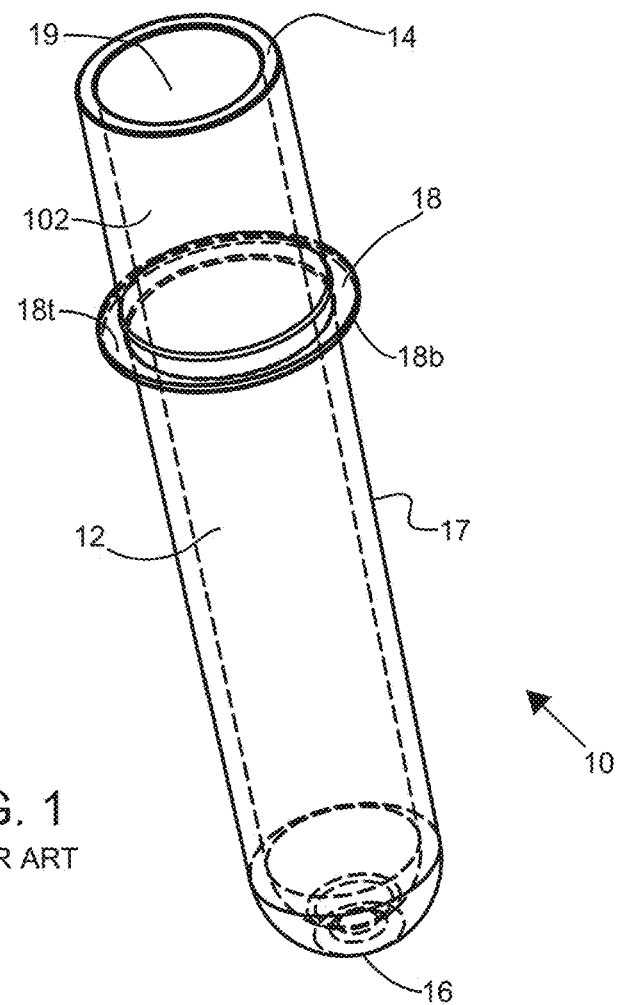
FIG. 1 is a perspective view of a typical prior art vessel for processing and analyzing by an immunodiagnostic instrument.
Figure 2:
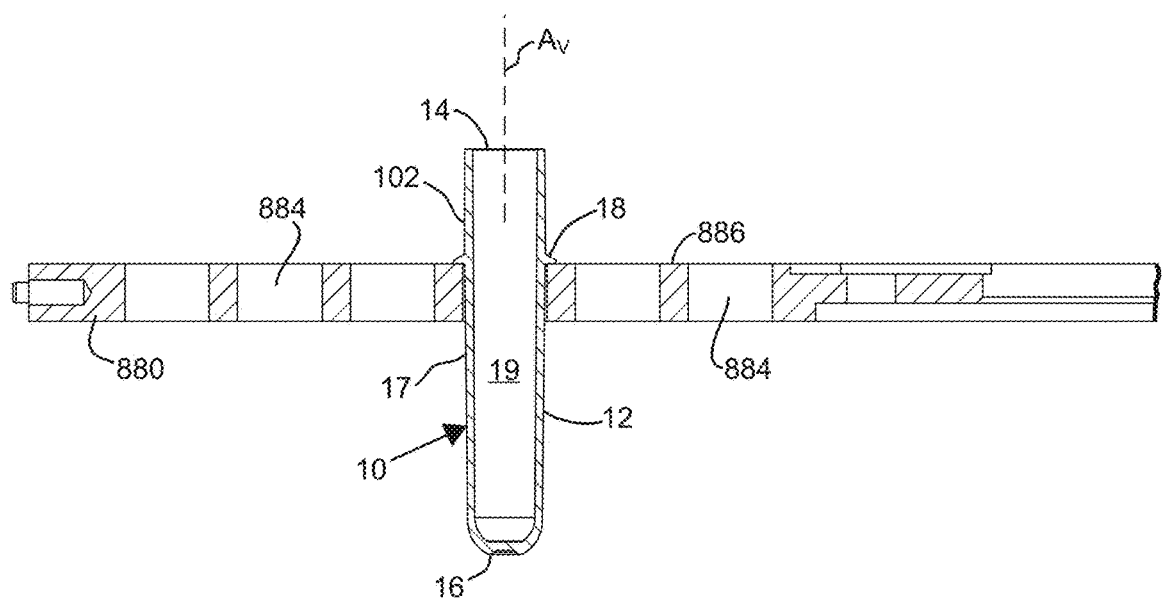
FIG. 2 is a partial cross-sectional elevational view of the vessel of FIG. 1 held by a component of the immunodiagnostic instrument.
Figure 20:
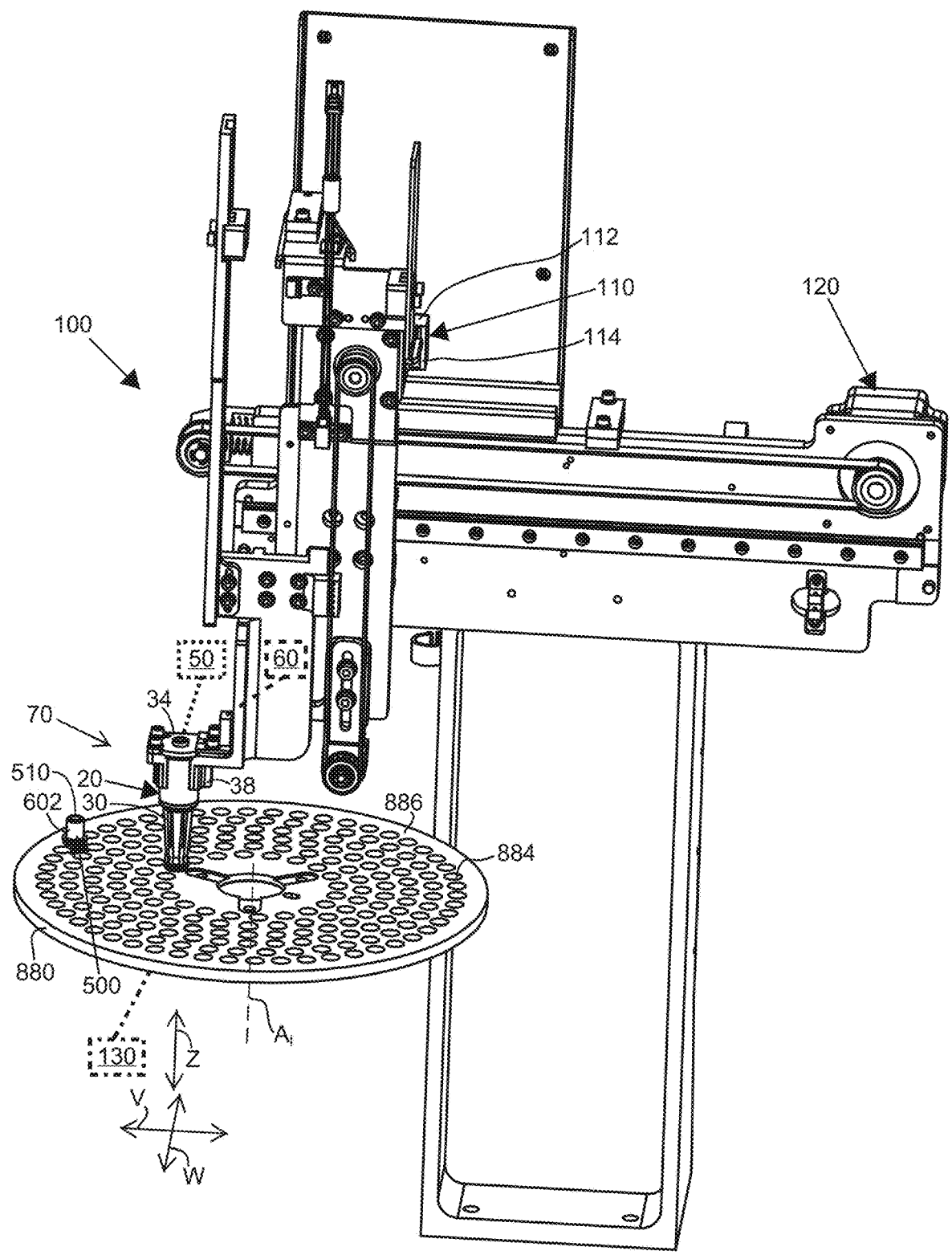
FIG. 20 is a perspective view of a pick and place unit with the picking and placing gripper of FIG. 3 operating on one of the targets of FIG. 16, according to the principles of the present disclosure.

According to the principles of the present disclosure, a picking and placing system includes a gripper for gripping vessels. A typical vessel 10 is shown at FIG. 1. As depicted, the vessel 10 is a prior art vessel. The vessel 10 includes an elongated hollow, cylindrical body 12 with an open top end 14 and a closed bottom end 16. On an exterior sidewall 17 of the cylindrical body 12, optionally, there may be a circular flange 18 located below, but adjacent to, the top end 14. As depicted, the flange 18 includes a top surface 18t and a bottom surface 18b. As illustrated at FIGS. 1 and 2, an interior 19 of the vessel 10 may be accessed through the open top end 14. Such vessels 10 may be used in an analyzing instrument, as schematically depicted in an example analyzing instrument 800 at FIG. 26. In particular, the interior 19 of the vessel 10 may hold various samples and may serve as a reaction vessel, a dilution vessel, a sample vessel, etc. A plurality of such vessels 10 may be used simultaneously in the instrument 800. A plurality of tests may be processed simultaneously in various reaction vessels 10 circulating through the instrument 800. A positioning mechanism 100 may be used to move the vessel 10 among and between the various subsystems of the instrument 800. An exemplary positioning mechanism 100 is illustrated at FIG. 20. Such positioning mechanisms 100 may include picking and placing systems, pick and place units, etc. Such positioning mechanisms 100 may handle the vessel 10 by gripping a gripped portion 102 of the vessel 10.

Figure 3:
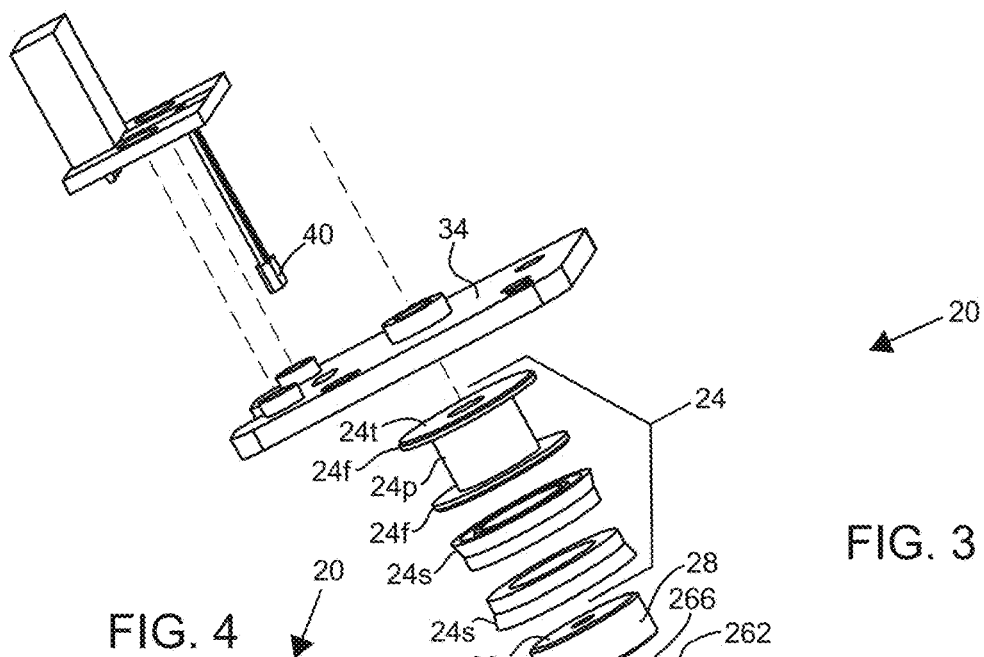
FIG. 3 is an exploded perspective view of a picking and placing gripper, according to the principles of the present disclosure.
Figure 4:
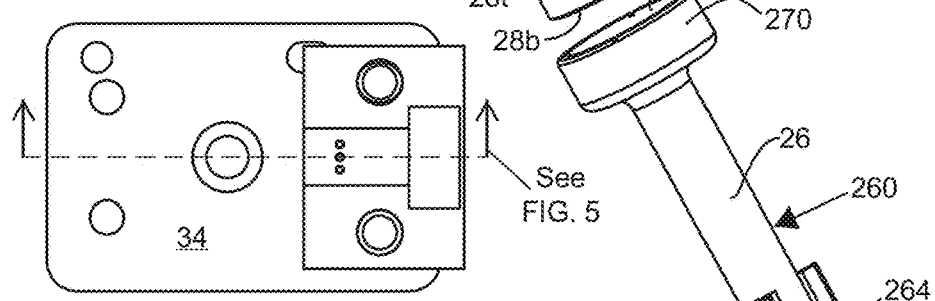
FIG. 4 is a top plan view of the picking and placing gripper of FIG. 3.

Referring to FIG. 3, there is shown an embodiment of a gripper assembly 20, according to the principles of the present disclosure. The gripper assembly 20 may be mounted on the positioning mechanism 100.

Figure 5:
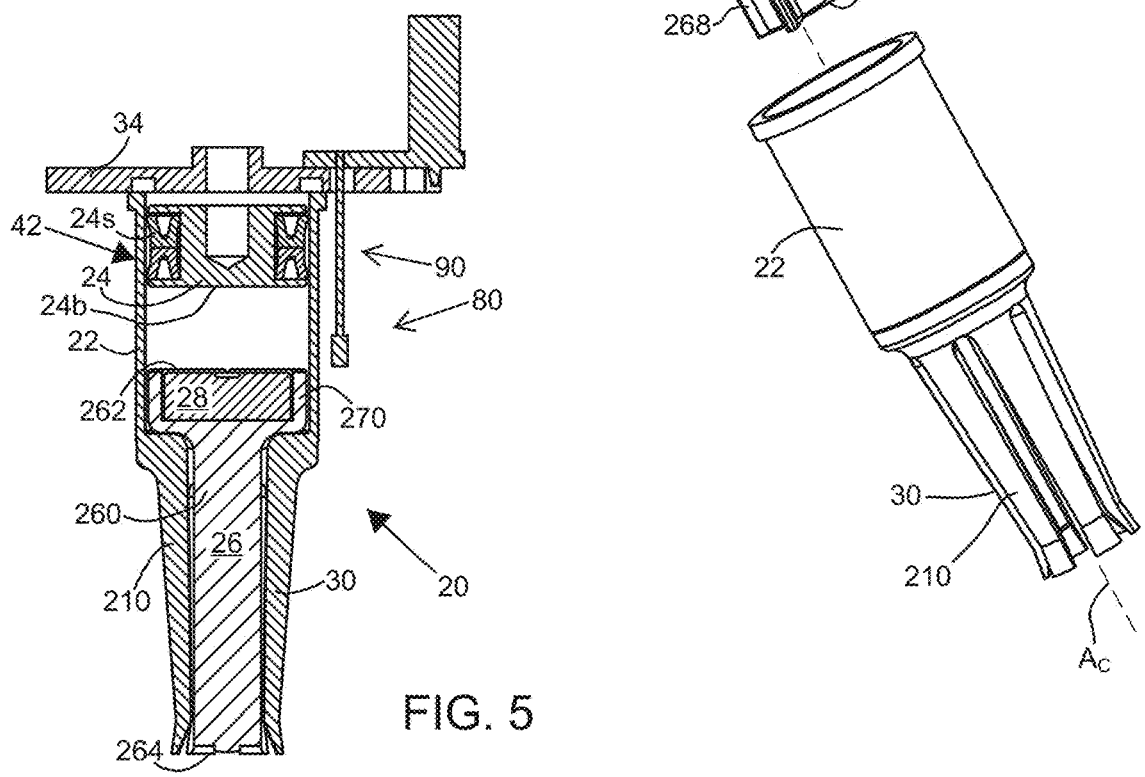
FIG. 5 is a cross-sectional elevation view of the picking and placing gripper of FIG. 3, as called out at FIG. 4.

As depicted, the gripper assembly 20 has an elongated cylinder 22, a piston 24, and an ejector 260. As illustrated at FIGS. 9-11, the piston 24 and the ejector 260 may move separately within the cylinder 22. As illustrated at FIGS. 3 and 5, the gripper assembly 20 further includes a deformable gripping portion 210. In the depicted embodiment, the deformable gripping portion 210 is a collet. The deformable gripping portion 210 may be positioned over the gripped portion 102 of the vessel 10 by the positioning mechanism 100. As illustrated at FIG. 9, positioning at least a portion of the deformable gripping portion 210 over the gripped portion 102 engages the vessel 10 to the gripper assembly 20 as the deformable gripping portion 210 slightly expands thereby creating a friction fit between the deformable gripping portion 210 and the gripped portion 102 of the vessel 10. As the deformable gripping portion 210 is resilient, the deformable gripping portion 210 returns to its initial configuration upon the vessel 10 being removed from the gripper assembly 20, as illustrated at FIGS. 10 and 11. The gripper assembly 20 may thereby be repeatedly used to engage a plurality of vessels 10 at the gripped portion 102.

Figure 6:
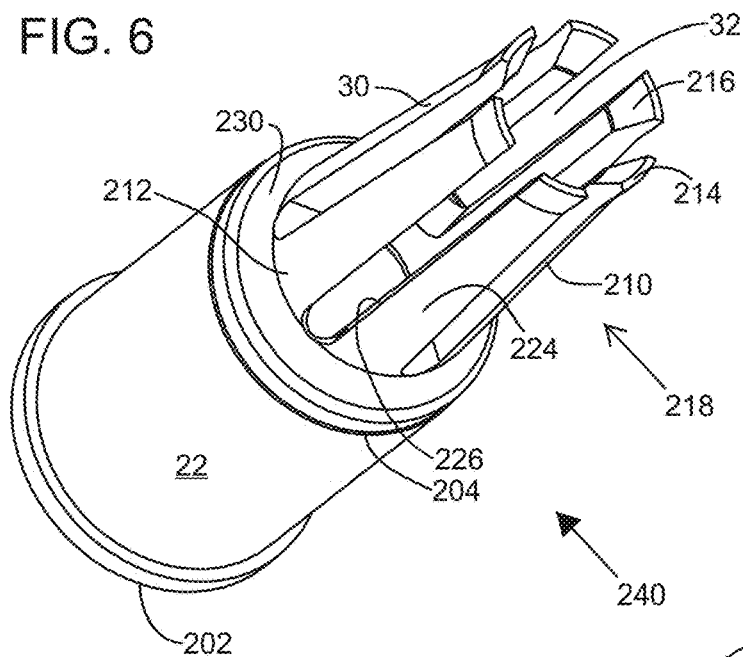
FIG. 6 is a perspective view of an integrated cylinder and collet of the picking and placing gripper of FIG. 3, according to the principles of the present disclosure.
Figure 8:
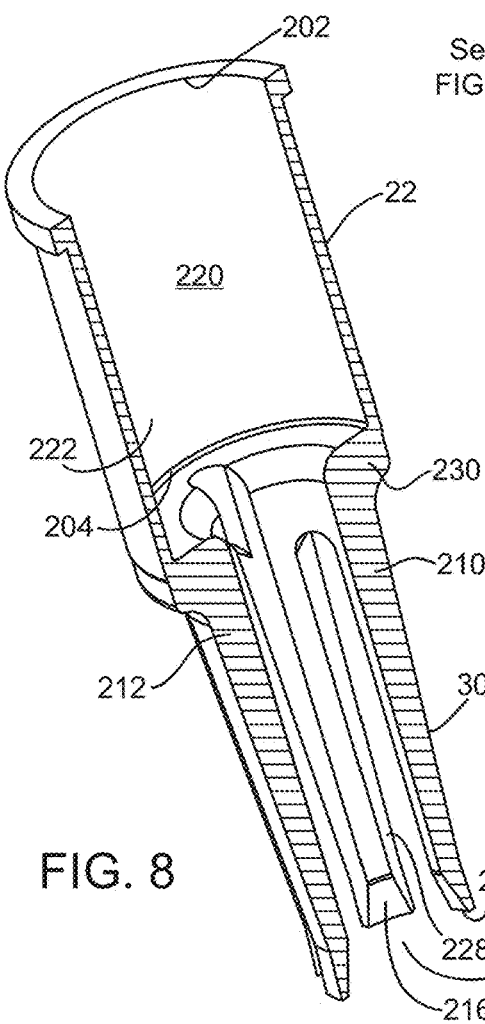
FIG. 8 is a perspective cutaway view of the integrated cylinder and collet of FIG. 6, as called out at FIG. 7.

As depicted at FIGS. 6 and 8, the cylinder 22 and the deformable gripping portion 210 are made of a single monolithic piece 240. In the depicted embodiment, an end rim 230 joins the cylinder 22 to the deformable gripping portion 210. In the depicted embodiment, the vessel 10 is axisymmetric and has a central longitudinal axis $A_V$ (see FIG. 2). The deformable gripping portion 210 also includes a central longitudinal axis $A_C$ (see FIG. 3). In the depicted embodiment, the cylinder 22 includes an internal surface 220 with a circular cross-section 222. In the depicted embodiment, the cylinder 22 shares the axis $A_C$ with the deformable gripping portion 210. In other embodiments, the vessel 10, the cylinder 22, and the deformable gripping portion 210 may include non-circular and/or non-axisymmetric forms.

As illustrated at FIG. 8, the cylinder 22 extends between a first end 202 and a second end 204. The end rim 230 is positioned adjacent the second end 204 of the cylinder 22. The deformable gripping portion 210 extends from the end rim 230. As depicted, the deformable gripping portion 210 extends between a first end 212 and a second end 214. The first end 212 is adjacent the end rim 230. An opening 32 is provided at the second end 214. The opening 32 may accept the gripped portion 102 of the vessel 10, when the vessel 10 is engaged by the gripper assembly 20. To facilitate engagement of the vessel 10 by the gripper assembly 20, a chamfer 216 may be provided at the opening 32.

Figure 7:
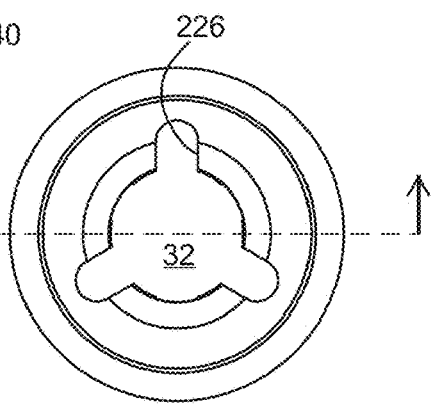
FIG. 7 is a top plan view of the integrated cylinder and collet of FIG. 6.

As depicted, the deformable gripping portion 210 includes a plurality of gripping members 30. The gripping members 30 may be formed by fingers 224 that are cantilevered from the first end 212 of the deformable gripping portion 210. The fingers 224 may be separated from each other by a plurality of thru slots 226 and partial slots 228. In particular, as shown at FIG. 7, the thru slots 226 extend through the single monolithic piece 240. The partial slots 228 extend from the second end 214 of the deformable gripping portion 210 to adjacent the first end 212. The fingers 224 thereby have a spaced-apart relationship 218. As will be further described hereinafter, the thru slots 226 accommodate assembly of the ejector 260.

The gripping members 30 are spring-like and/or have spring-like properties, so that they are flexible enough to allow them to deform or deflect to allow the gripped portion 102 of the vessel 10 to be inserted therebetween yet rigid enough to have adequate strength and tension to hold the vessel 10, and with spring memories which not only create sufficient friction between the gripping members 30 and the vessel 10 to hold the vessel 10 in place, but also return them to their original configuration after the vessel 10 is released. The gripping members 30 may be made of semi-rigid flexible material or other suitable material. Examples of such material include, but are not limited to, plastic materials and the like.

In one embodiment of the present disclosure, a gripper assembly 20 has at least two gripping members 30. Both gripping members 30 may be flexible, or at least one is flexible and another one may be fixed. In the depicted embodiment, the opening 32 is thereby a slotted expandable circular opening adapted to receive the gripped portion 102 of the vessel 10. The chamfer 216 may allow the flexible gripping members 30 to pick up misaligned vessels 10. The chamfer 216 may allow the flexible gripping members 30 to be urged outwardly by the vessel 10 as the positioning mechanism 100 and/or the gripper assembly 20 applies the opening 32 over the gripped portion 102 and/or the top end 14. In the depicted embodiment, the flexible gripping members 30 are external to the gripped portion 102 when engaged. In other embodiments, flexible gripping members may be internal to a gripped portion of a vessel when engaged. In still other embodiments, a gripper assembly may have at least one external gripping member 30 and at least one internal gripping member.

Turning now to FIGS. 3 and 5, the piston 24 will be further described. As depicted, the piston 24 extends between a first end 24t and a second end 24b. In the depicted embodiment, the first end 24t is a top end 24t of the piston 24, and the second end 24b is a bottom end 24b of the piston 24. The piston 24 may include a plug 24p that extends between the first end 24t and the second end 24b. The plug 24p may include a pair of flanges 24f. In the depicted embodiment, one of the flanges 24f is positioned adjacent the first end 24t of the piston 24, and another of the flanges 24f is positioned adjacent the second end 24b of the piston 24. As depicted, a pair of seals 24s is captured between the pair of flanges 24f. In the depicted embodiment, the pair of seals 24s contact each other opposite the flanges 24f. In other embodiments, the seals 24s may be separated from each other. In still other embodiments, a single seal 24s or more than two seals 24s or no seals may be used. In the depicted embodiment, the seals 24s are lip seals. As depicted at FIG. 5, the piston 24 and the cylinder 22 may form a pneumatic actuator 42. In the depicted embodiment, the pneumatic actuator 42 is a one-way pneumatic actuator 42.

Turning again to FIGS. 3 and 5, the ejector 260 will be further described. The ejector 260 extends between a first end 262 and a second end 264. The ejector 262 includes a plunger portion 26 adjacent the second end 264 and a head portion 270 adjacent the first end 262. As depicted, the plunger portion 26 includes a plurality of fins 268. In the depicted embodiment, the plunger portion 26 includes three of the fins 268. A pocket 266 may be included at the first end 262 of the ejector 260. The pocket 266 may hold a magnet 28. The magnet 28 may extend between a first end 28t and a second end 28b. In the depicted embodiment, the first end 28t is a top end 28t, and the second end 28b is a bottom end 28b. As mentioned above, the thru slots 226 accommodate assembly of the ejector 260 into the single monolithic piece 240. In particular, the fins 268 may be aligned with the thru slots 226 with the ejector 260 positioned relative to the single monolithic piece 240, as depicted at FIG. 3. The fins 268 may slide through the internal surface 220 of the cylinder 22 and reach the thru slots 226. The ejector 260 may be further positioned within the single monolithic piece 240, and the fins 268 slid along the thru slots 226.

As illustrated at FIG. 9, when the positioning mechanism 100 places the gripper assembly 20 over the gripped portion 102 of the vessel 10, the ejector 260 is raised. If the piston 24 is not already raised, the ejector 260 will raise the piston 24. By having the fins 268 stick through the thru slots 226 in a radial direction relative to the axis $A_C$, the top end 14 of the vessel 10 is securely engaged with the ejector 260 (e.g., at the second end 264). In particular, the fins 268 extend radially substantially beyond an outer radius of the gripped portion 102 of the vessel 10. By having three fins 268, three regions of contact are established between the ejector 260 and the end 14 of the vessel 10. As the three regions of contact establish the plane of the end 14 of the vessel 10 with a plane defined by the second end 264 of the ejector 260, no tendency for tipping the vessel 10 is created. As the positioning mechanism 100 engages the vessel 10 with the gripper assembly 20, the chamfers 216 engage an outer perimeter of the end 14 of the vessel 10 and thereby spread apart the cantilevered fingers 224 from each other. The deformation associated with the spreading apart of the fingers 224 results in an inward force from the fingers 224 being applied against the gripped portion 102 of the vessel 10. In the depicted embodiment, this force is an inward radial force that generates friction between the gripping members 30 and the gripped portion 102 of the vessel 10. The frictional force is adequate to move the vessel 10 throughout the instrument 800 in normal operation of instrument 800.

Upon the positioning mechanism 100 reaching a destination of delivery for the vessel 10, the ejector 260 may be actuated by the piston 24 to remove the vessel 10 from the gripper assembly 20. In particular, as illustrated at FIG. 10, the piston 24 drives the ejector 260 toward the second end 214 of the deformable gripping portion 210. The second end 24b of the piston 24 contacts the first end 262 of the ejector 260 and thereby applies force to move the ejector 260 toward the second end 214 and thereby expel the vessel 10 from the gripper assembly 20. The positioning mechanism 100 may be moved in coordination with the actuation of the piston 24 and dropping of the vessel 10 may thereby be avoided.

In certain circumstances, the vessel 10 may inadvertently become disengaged from the gripper assembly 20, as illustrated at FIG. 11. In such circumstances, the ejector 260 separates from the piston 24. In the depicted embodiment, the ejector 260 drops away from the piston 24. In the depicted embodiment, the ejector 260 has sufficiently low friction when sliding within the internal surface 220 of the cylinder 22 of the single monolithic piece 240 that the downward pull of gravity on the ejector 260 is sufficient to move the ejector 260 away from the piston 24. One or both of the seals 24s of the piston 24 have sufficient friction with the internal surface 220 of the cylinder 22 such that the piston 24 remains at its position as the ejector 26 moves toward the second end 214 of the deformable gripping portion 210. Thus, the friction between one or more of the seals 24s and the internal surface 220 is sufficient to support the piston 24 against the pull of gravity. Thus, the friction between the piston 24 and the cylinder 22 is sufficient to support the piston 24 against the pull of gravity. In the depicted embodiment, gravity thereby actuates the ejector 260 by urging the ejector 260 toward the second end 214. In other embodiments, the ejector 260 may be urged by other means. For example, a spring, a magnetic force, an electrostatic force, a force applied by another actuator, etc. may urge the ejector 260 toward the second end 214.

A prior art gripper assembly is disclosed at U.S. Pat. No. 7,128,874, incorporated herein by reference in its entirety. In this prior art gripper assembly, a piston and an ejector move together and thereby operate differently from the gripper assembly 20 of the present disclosure.

The gripper assembly 20 further includes a sensor 40, according to the principles of the present disclosure. As depicted, the sensor 40 is a Hall-effect sensor. In other embodiments, other sensors may be used. The sensor 40 may detect the presence of the magnet 28 positioned within the pocket 266 of the ejector 260. The sensor 40 may thereby detect the position of the ejector 260 and thereby report the position of the ejector 260 to a sensor system 60 of the positioning mechanism 100 and/or the instrument 800. In particular, the sensor 40 may detect a vessel present position 70, depicted at FIG. 9. The sensor 40 may further detect a vessel absent position 80, depicted at FIGS. 5, 10, and 11. In the depicted embodiment, the vessel present position 70 corresponds with the ejector 260 being positioned away from the second end 214 of the deformable gripping portion 210 and being positioned such that the head portion 270 is spaced away from the second end 204 of the cylinder 22. The vessel absent position 80 corresponds with the ejector 260 being positioned toward the second end 214 of the deformable gripping portion 210 and such that the head portion 270 of the ejector 260 is positioned toward the second end 204 of the cylinder 22.

According to the principles of the present disclosure, the piston 24 may be positioned at a first position 90 and a second position 92. In the depicted embodiment, the first position 90 corresponds with a piston-up position, and the second position 92 corresponds with a piston-down position. In other embodiments, the up and down orientations may or may not apply. The first piston position 90 is illustrated at FIGS. 5, 9, and 11. The second piston position 92 is illustrated at FIG. 10. As illustrated, the first piston position 90 is compatible with the vessel present position 70 and the vessel absent position 80. In contrast, the piston down position 92 is only compatible with the vessel absent position 80.

The sensor 40 can be used to confirm a successful pickup of the vessel 10 by the gripper assembly 20. In particular, as shown at FIG. 9, when the vessel 10 moves the ejector 260 to the vessel present position 70, the magnet 28 is detected by the sensor 40. If no vessel were present at the pickup position, the ejector 260 would remain at the vessel absent position 80. The sensor 40 may further detect when a successful drop-off of the vessel 10 has occurred. In particular, as illustrated at FIG. 10, when the positioning mechanism 100 reaches a drop-off position, the piston 24 is actuated thereby urging the ejector 260 to the vessel absent position 80. The positioning mechanism 100 may move the gripper assembly 20 away from the vessel 10 as the ejector 260 drives the gripped portion 102 of the vessel 10 out of the deformable gripping portion 210 of the gripper assembly 20. As the magnet 28 passes the sensor 40, the vessel absent position 80 is confirmed. The sensor 40 may further detect when the vessel 10 is otherwise removed from the gripper assembly 20. In particular, as illustrated at FIG. 11, the vessel 10 has been disengaged and removed from the gripper assembly 20, and the vessel 10, via the gripped portion 102 of the vessel 10, no longer holds the ejector 260 from falling toward the vessel absent position 80. As the magnet 28 passes the sensor 40, the vessel absent position 80 of the ejector 260 is confirmed. As the ejector 260 being at the vessel absent position 80 combined with the piston 24 being at the first position 90 (see FIG. 11) typically indicates an abnormal and undesired condition when handling vessels 10, the sensor 40 and the sensor system 60 may alert the positioning mechanism 100 and/or the instrument 800 that a vessel 10 has fallen from the gripper assembly 20. As mentioned above, friction between one or more of the seals 24s and the internal surface 220 is sufficient to support the piston 24 against the pull of gravity. Thus, the piston 24 remains at the first position 90 when the vessel 10 has fallen from the gripper assembly 20. In certain embodiments, another sensor may be employed to detect the position of the piston 24 (e.g., the first position 90 and/or the second position 92).

According to the principles of the present disclosure, the gripper assembly 20 may further be used to locate and/or align with targets. As illustrated at FIGS. 12-23, a plurality of example target assemblies 500 may be positioned at various locations around the instrument 800, and the gripper assembly 20 may locate and/or align with a target 510 of the target assembly 500. In the example embodiment, the target 510 is cylindrical with a central longitudinal axis $A_P$ (see FIG. 24). In other embodiments, the target 510 may have other shapes. In the example embodiment, the target 510 includes a gripped portion 602 that is similar in size and shape to the gripped portion 102 of the vessel 10.

The gripper assembly 20 may be positioned by the positioning mechanism 100 over the target 510 in much the same way as the gripper assembly 20 is positioned over the vessel 10. For example, the axis $A_P$ of the target 510 may be aligned with the axis $A_C$ of the deformable gripping portion 210 of the gripper assembly 20. Likewise, the sensor 40 may sense the presence of the target 510 and/or the gripped portion 602 of the target 510 in the same way as the presence of the vessel 10 and/or the gripped portion 102 of the vessel 10 is sensed. In particular, a pin present position 70 is illustrated at FIGS. 13, 14, and 20. A pin absent position 80 is illustrated at FIGS. 12 and 15.

The positioning mechanism 100 may place the gripper assembly 20 over the target 510, as illustrated at FIG. 12. The positioning mechanism 100 may further engage the gripped portion 602 of the target 510 with the deformable gripping portion 210, as illustrated at FIG. 13. The positioning mechanism 100 may further lift the target 510 and the presence of the gripped portion 602 may be confirmed by the sensor 40 in the same way as the presence of the gripped portion 102 of the vessel 10 is confirmed. As illustrated at FIG. 15, the piston 14 may be actuated to drive the gripped portion 602 of the target 510 out of the deformable gripping portion 210 of the gripper assembly 20 in the same way that the gripped portion 102 of the vessel 10 may be ejected from the gripper assembly 20. Upon a misalignment between the target 510 and the gripper assembly 20, the lifting operation illustrated at FIG. 14 may result in a dropped target 510 thereby indicating a misalignment.

Turning now to FIGS. 13, 15, and 24, the target assembly 500 will be described in detail. In addition to the target 510, the target assembly 500 may include a bushing 508 and a keeper 506. The bushing 508 may be attached to various components within the instrument 800 and thereby locate the target 510 with respect to the component. In particular, a longitudinal axis $A_T$ may be established on various components of the instrument 800 by positioning the bushing 508 on the component and further installing the target 510 into the bushing 508. A keeper 506 may be attached to the target 510 and thereby keep the target from being removed from the component of the instrument 800.

Figure 26:
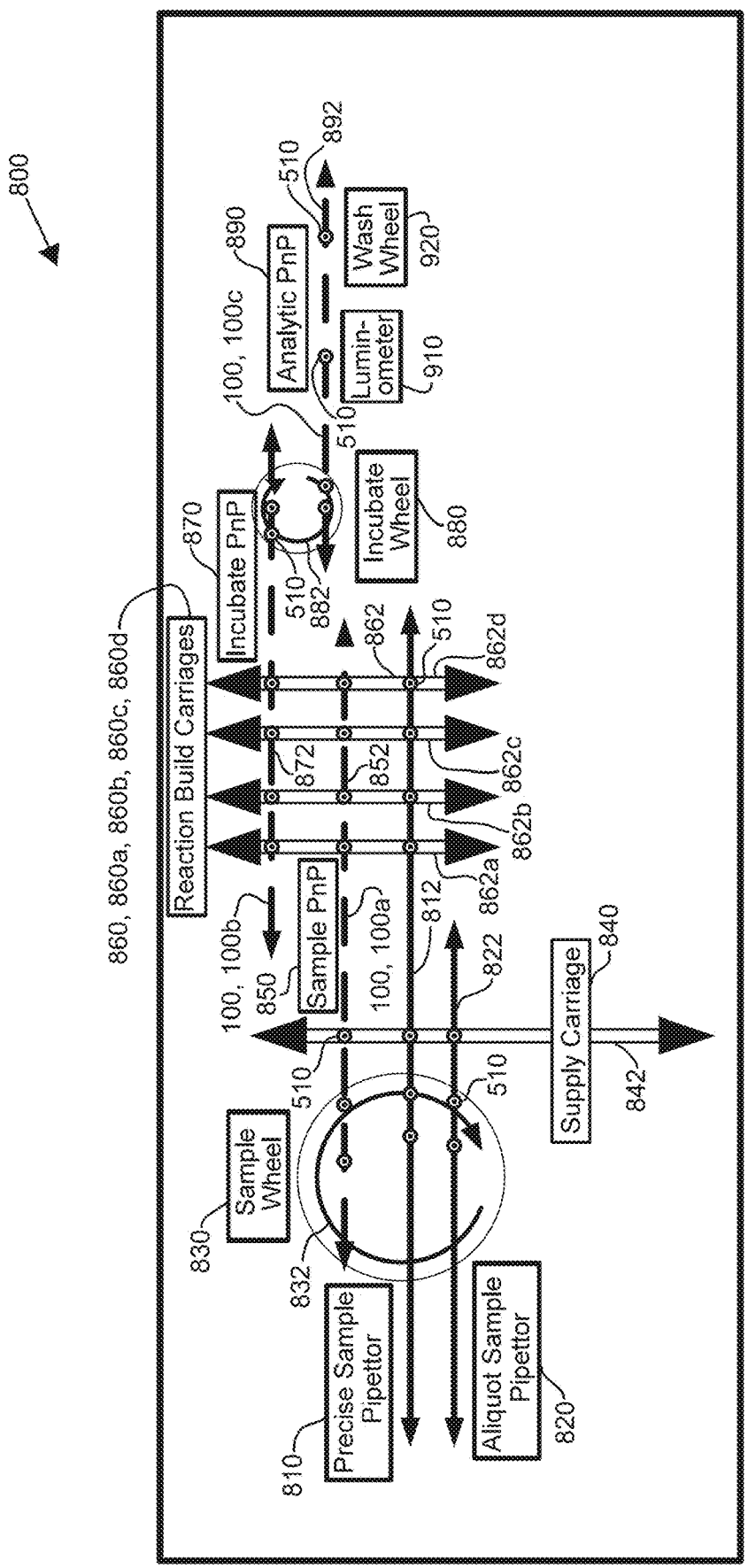
FIG. 26 is a schematic plan view of an instrument compatible with the prior art vessel of FIG. 1, the picking and placing gripper of FIG. 3, the targets of FIGS. 12-25, the pick and place unit of FIG. 20, and the probe of FIGS. 21 and 22, according to the principles of the present disclosure.

Turning now to FIG. 26, a plurality of targets is illustrated on a schematic diagram of an example instrument 800. In particular, one or more of the targets 510 may be installed via a target assembly 500 to a sample wheel 830, a supply carriage 840, a reaction build carriage 860, an incubate wheel 880, a luminometer 910, and/or a wash wheel 920. The gripper assembly 20 may be used on a plurality of pick and place positioning mechanisms 100. In particular, a sample pick and place unit 850 may include a gripper assembly 20 that distributes vessels 10 between the sample wheel 830, the supply carriage 840, and/or a plurality of reaction build carriages 860a, 860b, 860c, 860d. The sample pick and place unit 850 may be a first pick and place unit 100a. An incubate pick and place unit 870 may be used to distribute vessels 10 between the reaction build carriages 860a, 860b, 860c, 860d and the incubate wheel 880. The incubate pick and place unit 870 may be a second positioning mechanism 100b. An analytic pick and place unit 890 may distribute the vessels 10 between the incubate wheel 880, the luminometer 910, and the wash wheel 920. The analytic pick and place unit 890 may be a third positioning mechanism 100c.

To successfully transfer vessels 10 among the various components of the instrument 800, the various systems must be aligned with each other. In particular, the pick and place units 100a, 100b, 100c must be adequately aligned with the sample wheel 830, the supply carriage 840, the reaction build carriages 860, the incubate wheel 880, the luminometer 910, and the wash wheel 920. According to the principles of the present disclosure, the same gripper assembly 20 that transports the vessels 10 between the various components of the instrument 800 may further serve to align the various components of the instrument 800 by being used in conjunction with the various targets 510 positioned on various components of the instrument 800.

FIGS. 12-16 illustrate a pair of targets 510a, 510b mounted to the incubate wheel 880. As illustrated at FIG. 16, the incubate wheel 880 rotates about an incubate wheel axis $A_I$ thereby assuming a rotational orientation α. As illustrated at FIG. 20, the incubate wheel 880 may be oriented at its rotational orientation α by an actuator 130. An actuator 120 of the positioning mechanism 100 may move the gripper assembly 20 in a first direction V and the actuator 130 may move the targets 510, 510a, 510b in a direction W that is nonparallel with the direction V actuated by the actuator 120. Upon reaching the desired position, an actuator 110 of the positioning mechanism 100 may position the gripper assembly 20 over the target 510a or 510b by moving in a direction Z that is nonparallel with the directions V and W and thereby engage the deformable gripping portion 210 with the gripped portion 602 of the target 510a or 510b. By moving the wash wheel 880 with the actuator 130 and moving the gripper assembly 20 with the actuator 120, the gripper assembly 20 may be aligned with the target 510a or 510b. Upon the first of the targets 510a or 510b being established with the positioning mechanism 100, the process can be repeated on the other target 510b or 510a, and the rotational orientation α can be determined in addition to the positional locations of the targets 510a and 510b.

The sample wheel 830 may similarly use a pair of targets 510a and 510b to establish a rotational orientation of the sample wheel and linear positional locations of the targets 510a and 510b.

The wash wheel 920 may similarly establish a rotational orientation and positional location with a pair of targets 510a and 510b. However, in the depicted embodiment, a single target 510 is used on the wash wheel 920.

Other components of the instrument 800 may further be located by a single target. As illustrated at FIG. 17, the luminometer 910 may include a mount 910m that holds a target assembly 500. Likewise, the reaction build carriages 860 may each include a mount 860m that holds a target assembly 500 to the particular reaction build carriage. Likewise, the supply carriage 840 may include a mount 840m that holds a target assembly 500 to the supply carriage 840.

Turning again to FIG. 26, a pick and place unit path 852 of the sample pick and place unit 850 may be aligned with a sample wheel path 832 of the sample wheel 830, a supply carriage path 842 of the supply carriage 840, and a plurality of reaction build carriage paths 862a, 862b, 862c, and 862d, collectively known as the reaction build carriage paths 862, of their respective reaction build carriages 860.

An incubate pick and place unit path 872 of the incubate pick and place unit 870 may similarly be aligned to the reaction build carriages 860 and to the incubate wheel 880. The analytic pick and place unit 890 may similarly be aligned to the incubate wheel 880, the luminometer 910, and the wash wheel 920. In particular, the incubate pick and place unit 870 may align to the reaction build carriage paths 862 and the incubate wheel path 882. The analytic pick and place unit 890 may align to the incubate wheel path 882 and to the target position of the luminometer 910 and to the target position of the wash wheel 920.

Turning now to FIGS. 24 and 25, the target 510 will be further described. The target 510 includes a pin body 512 that extends between a top 514 and a bottom 516. The gripped portion 602 (e.g., a pin, a head) is positioned adjacent the top 514 of the pin body 512. A tail 606 of the pin body 512 is positioned adjacent the bottom 516 of the pin body 512. A flange 604 is positioned between the gripped portion 602 and the tail 606 of the pin body 512. The flange 604 includes a first side 604t and a second side 604b. As depicted, the first side 604t is a top side 604t, and the second side 604b is a bottom side 604b. A groove 608 may be included adjacent the bottom 516 of the pin body 512. The groove 608 may engage the keeper 506 of the pin assembly 500. A chamfer 614 adjacent the second end 516 of the pin body 512 may ease installation of the target 510 into the bushing 508. A chamfer 612 may be included between the gripped portion 602 and the first end 514 of the pin body 512. The gripped portion 602 may include an edge or edges 520 around a perimeter of the gripped portion 602 adjacent the first end 514 of the pin body 512. In the depicted embodiment, the gripped portion 602 is a cylindrical shape and therefore has a circular edge 520 that extends around the perimeter of the gripped portion 602 adjacent the first end 514 of the pin body 512.

The edge 520 may be divided into edge portions for use when the gripper assembly 20 is aligned with the target 510. In particular, as illustrated at FIG. 25, an edge portion 522 is positioned at the top of the edge 520. An edge portion 524 is positioned opposite from the edge portion 522 and is illustrated at the bottom of the edge 520 at FIG. 25. An edge portion 526 is illustrated at FIG. 25 on a right side of the edge 520, and an edge portion 528 is illustrated at a left side of the edge 520 at FIG. 25. A center 540 is illustrated at FIG. 25 at the center of the edge 520 and centered between the edge portions 522 and 524 and also centered between the edge portions 526 and 528. The center 540 further intersects with the axis $A_T$.

A female cone 610 may be included at the first end 514 of the pin body 512. As illustrated at FIGS. 21 and 22, a probe of the instrument 800 may be aligned with the female taper 610. As illustrated at FIG. 26, the instrument 800 includes a precise sample pipettor 810 and an aliquot sample pipettor 820. The pipettors 810, 820 each include one of the probes 700. One of the probes 700 of the precise sample pipettor travels along a precise sample pipettor path 812, and the other of the probes 700 travels along an aliquot sample pipettor path 822 of the aliquot sample pipettor 820. The probe 700 extends between a proximal end 702 and a distal end 704. At the distal end 704, a male cone 706 is positioned for engaging the taper 610 of the target 510. The precise sample pipettor path 812 and the aliquot sample pipettor path 822 can thereby be aligned with the sample wheel 830 and the sample wheel path 832 and further be aligned with the supply carriage 840 and the supply carriage path 842. The precise sample pipettor 810 can likewise be further aligned with the reaction build carriages 860.

The probe 700 further includes an internal passage 708 used to aspirate and/or dispense fluid out of and/or into the vessels 10 during normal operation of the instrument 800. The depicted probes 700 are designed to operate with disposable tips. A taper 710 is included near the distal end 704 of the probe 700 to engage the disposable tips (not shown).

Turning now to FIGS. 27-38, further details of the method of aligning the gripper assembly 20 and thereby the positioning mechanism 100 (i.e., pick and place unit) with the intersecting alignment pins 510 of the various components (i.e., interfacing modules) of the instrument 800 will now be described in detail. The positioning mechanisms 100, 100a, 100b, 100c (i.e., pick and place units) can be automatically aligned without operator interaction with the various subsystems (i.e., interfacing modules) of the instrument 800 by following the following steps. The instrument 800 may have default alignment positions (i.e., coordinates $V_D$, $W_D$) stored for all locations of the targets 510 positioned about the various components (i.e., interfacing modules) of the instrument 800, and the targets 510 may be reachable by one or more of the various pick and place units 100. Certain of the interfacing modules may be moveable via actuator, and certain others of the interfacing modules may be manually adjustable, but non-actuated. For example, the sample wheel 830, the supply carriage 840, the reaction build carriages 860, and the incubate wheel 880 may all be actuated; and the luminometer 910 and the wash wheel 920 may be non-actuated.

For example, as mentioned above and illustrated at FIG. 20, the actuator 120 of the positioning mechanism 100 may move the gripper assembly 20 in the first direction V. Thus, the actuator 120 drives one of the V-axes of the various pick and place units 100. The actuator 130 may move the interfacing module 880 and thereby move the targets 510, 510a, 510b locally in the direction W. Thus, for example, the actuator 130 drives one of the W-axes of the various interfacing modules of the instrument 800. A test is performed to determine the actual intersecting positions V, W of the targets 510 of the interfacing modules 830, 840, 860, 880, 910, 920 and the gripper assembly 20 of the pick and place unit 100. The test may be performed by moving the gripper assembly 20 and moving a corresponding interfacing module 830, 840, 860, 880 to the default alignment position $V_D$, $W_D$ (that is stored in memory). The test may further determine alignment (e.g., between the axes $A_C$ and $A_P$) between the gripper assembly 20 and the target 510 of the corresponding interfacing module by testing for slippage (e.g., stalling of the actuator 110) along the vertical axis (i.e., the Z-axis) of the pick and place unit 100.

Figure 27:
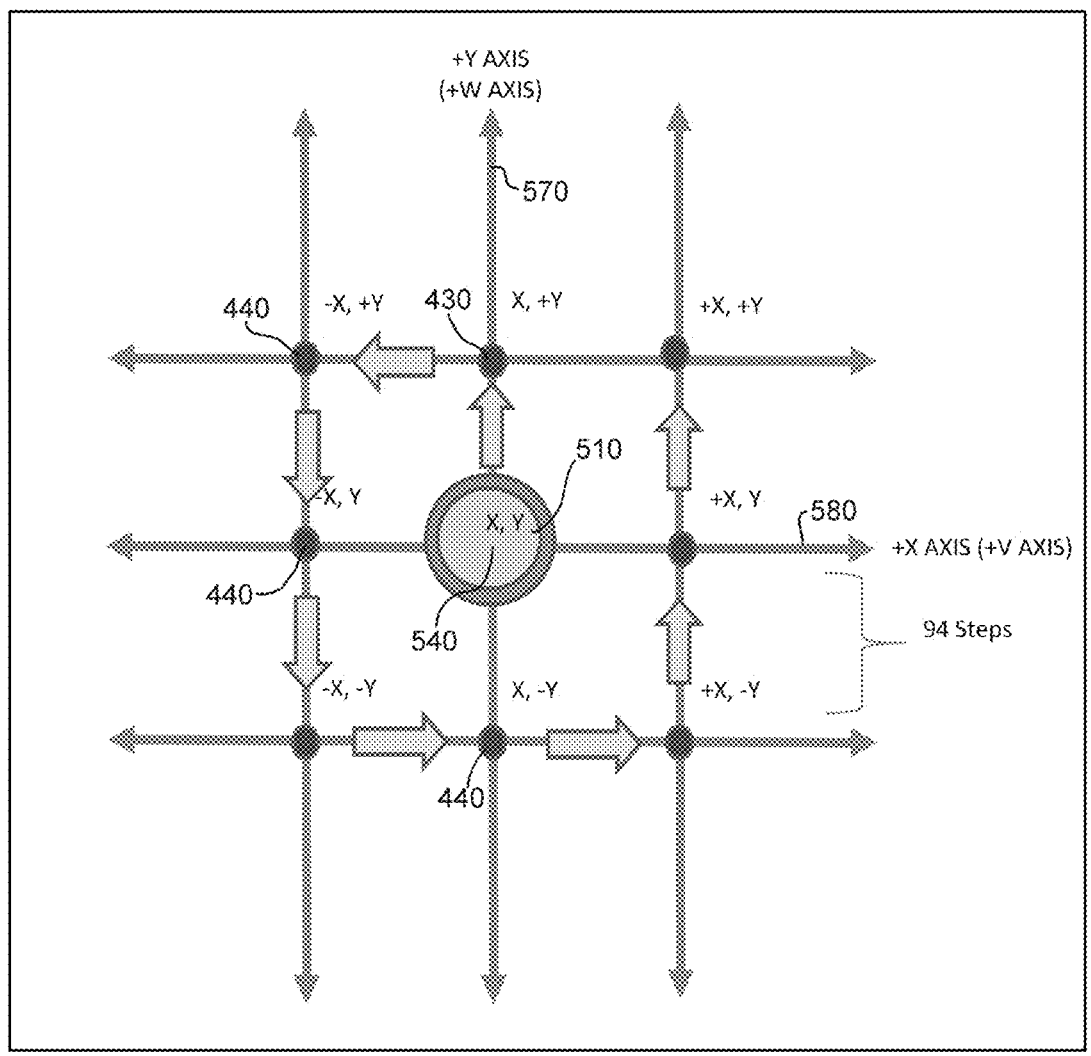
FIG. 27 is a schematic plan view of movements associated with an orthogonal, rectilinear grid hunting method using, for example, the picking and placing gripper of FIG. 3 and the target of FIG. 24, according to the principles of the present disclosure.
Figure 38:
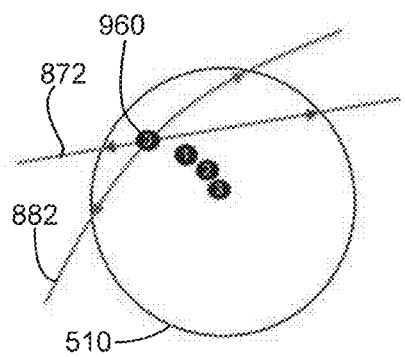
FIG. 38 is a schematic plan view of movements associated with a curvilinear grid hunting method using, for example, the picking and placing gripper of FIG. 3 and a target of FIG. 20, according to the principles of the present disclosure.

As depicted, the vertical axes (i.e., the Z-axes) of the pick and place units 100 are parallel with the axes $A_P$ of the targets 510 and the axes $A_C$ of the gripper assemblies 20. To test alignment between the axis $A_C$ of the gripper assembly 20 and the axis $A_P$ of the target 510, the actuator 110 is moved in the Z axis direction and the gripper assembly 20 is run against the target 510 or run against areas adjacent the target 510. This Z-axis test is repeated around the assumed position $V_D$, $W_D$ of the target 510 in a grid hunting fashion as illustrated at FIG. 27. In the depicted embodiment, the actuator 110 includes a stepper motor 112 and an encoder 114. By comparing the difference reported by the stepper motor 112 and the encoder 114, it may be determined if slippage (i.e., stalling) has occurred at the stepper motor 112. The stepper motor 112 may be operated at a reduced power level to make slippage occur at a lower force magnitude than would occur in normal operation of the actuator 110. If the slippage is not detected in a certain range, it is determined that the gripper assembly 20 has missed the pin 510 and grid hunting will resume, as illustrated at FIG. 27. For example, if the gripper assembly 20 has missed the pin 510 at the X, Y position, a new attempt will be made at the X, +Y position. Likewise, if the pin 510 is missed again, a third try will be made at the −X, +Y position. The gripper assembly 20 may be moved until all nine positions have been checked. In other embodiments, more than nine positions may be checked or fewer than nine positions may be checked. In the embodiment depicted at FIG. 27, the X, Y coordinates are rectilinear. In other embodiments, the coordinates may not necessarily be rectilinear, as illustrated at FIG. 38. In general, the coordinate V may be rectilinear or curvilinear, the coordinate W may be rectilinear or curvilinear, and/or the coordinate Z may be rectilinear or curvilinear. In the example at FIG. 27, the coordinate V is rectilinear and corresponds to linear coordinate X, and the coordinate W is rectilinear and corresponds to linear coordinate Y.

Figure 28:
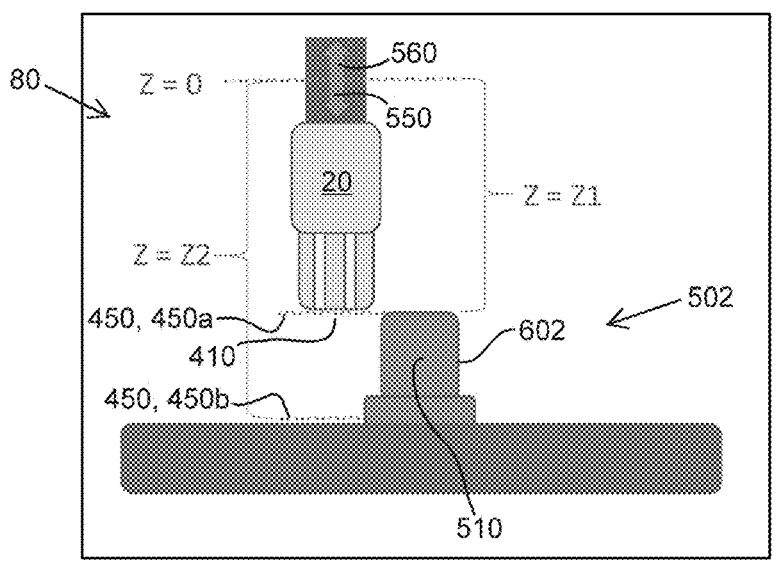
FIG. 28 is a schematic elevation view of movements associated with finding a presence of the target of, for example, FIG. 27 by detecting stalling of an actuator, according to the principles of the present disclosure.
Figure 29:
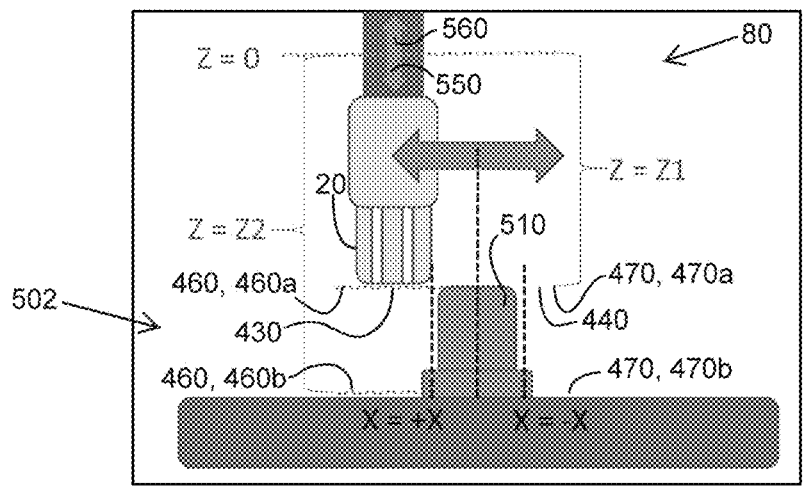
FIG. 29 is a schematic elevation view of movements used to determine edges of the target of, for example, FIG. 27, according to the principles of the present disclosure.

FIG. 28 illustrates the gripper assembly 20 being positioned at a first position near the top of the target 510. Upon testing for Z-axis stalling, a first stalled position 450 will be detected. If the first stalled position is at 450a, then the gripper assembly 20 has met the top of the target 510. If the first stalled position 450 is at 450b, then the target 510 has been missed. A first predetermined position 410 is thereby indicated at position X, Y of FIG. 27 at an elevation indicated at FIG. 28. Upon the gripper assembly 20 missing the target 510 at position X, Y, the gripper assembly 20 is moved to position 430, as illustrated at FIG. 27. If position 430 also results in the gripper assembly 20 missing the target 510, the gripper assembly 20 is moved to subsequent predetermined positions 440 until the target 510 is found. As illustrated at FIG. 29, a second stalled position 460 may be at 460a, in which the gripper assembly 20 has detected a top of the target 510. However, if the second stalled position 460 is 460b, then the target 510 has again been missed. Upon missing the target at the third predetermined position 430, the gripper assembly 20 is moved toward the subsequent predetermined positions 440 and the stalling test is repeated. As further illustrated at FIG. 29, the gripper assembly 20 may stall at the subsequent stalled position 470a which indicates the top of the target 510 has been detected. However, if the subsequent stalled positions 470 are at 470b, the target 510 has again been missed and additional subsequent predetermined positions 440, as illustrated at FIG. 27, will be tested until the target 510 is found.

Figure 30:
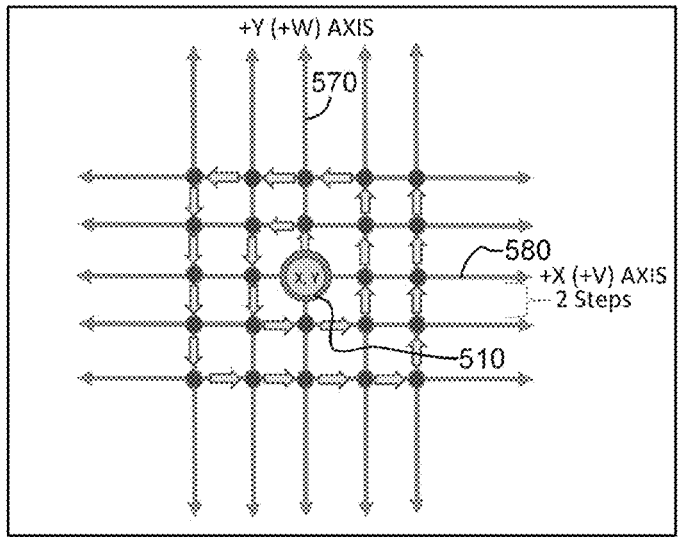
FIG. 30 is a schematic plan view of movements associated with testing a grip pattern of the picking and placing gripper of, for example, FIG. 3 and the target of, for example, FIG. 24 using orthogonal, rectilinear grid hunting, according to the principles of the present disclosure.
Figure 31:
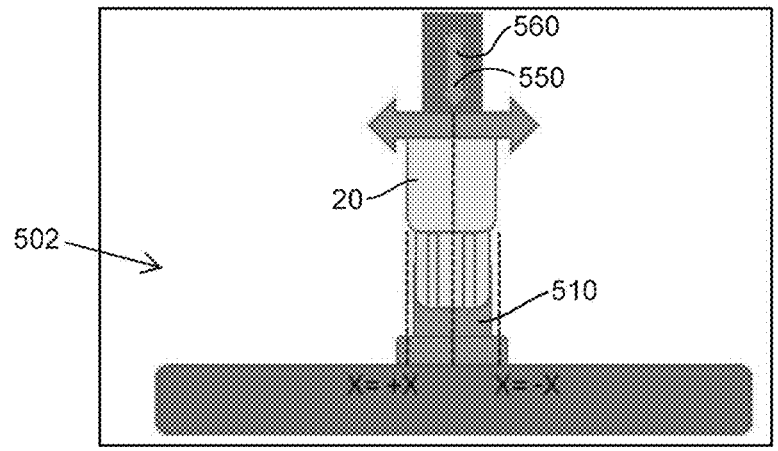
FIG. 31 is a schematic elevation view showing movements associated with the grip pattern of the picking and placing gripper of, for example, FIG. 3 and the target of, for example, FIG. 24, according to the principles of the present disclosure.
Figure 32:
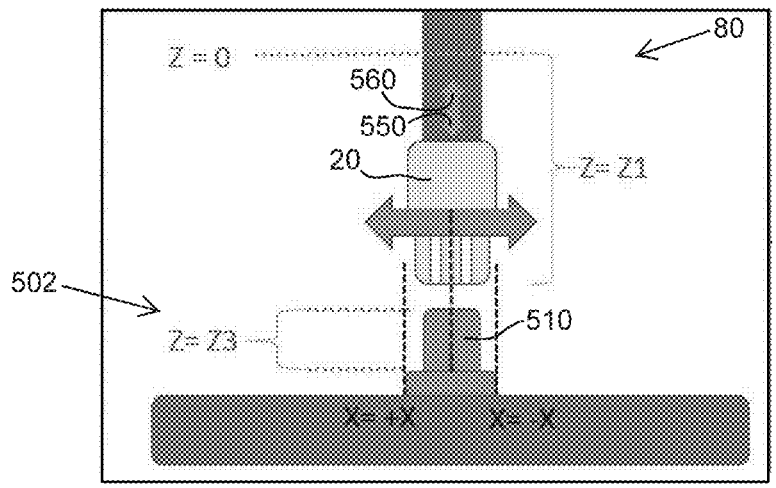
FIG. 32 is a schematic elevation view illustrating movements of a grip pattern testing the engagement of the pick and place gripper of, for example, FIG. 3 and the target of, for example, FIG. 24, according to the principles of the present disclosure.

Upon the target 510 being found, Z-axis slippage is again used to discover the boundaries of the target 510. In particular, the edges 522, 524, 526, 528 are located. This may also be done in a grid hunting fashion, as illustrated at FIG. 30. The increments used in the edge detecting grid hunting may be substantially smaller than the increments used in the initial pin detection grid hunting. Once the edges 522, 524, 526, 528 are discovered for the +X and −X limits, then the center 540 may be calculated along the X direction. This may be repeated for the +Y and −Y limits or +α and −α limits. After calculating centers for both directions, the gripper assembly 20 may be moved to the center position 540 and tested to see if it can reach a proper Z height while triggering the pin present position 70, determined by the sensor 40. If the sensor 40 is triggered to the vessel present position 70, then the alignment step is successful.

Figure 33:
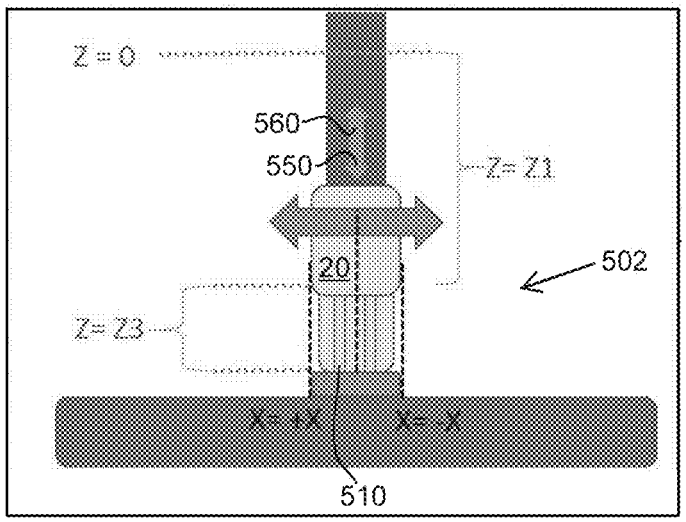
FIG. 33 is a schematic elevation view of the pick and place gripper of, for example, FIG. 3 engaging the target of, for example, FIG. 24 to test the grip pattern, according to the principles of the present disclosure.
Figure 34:
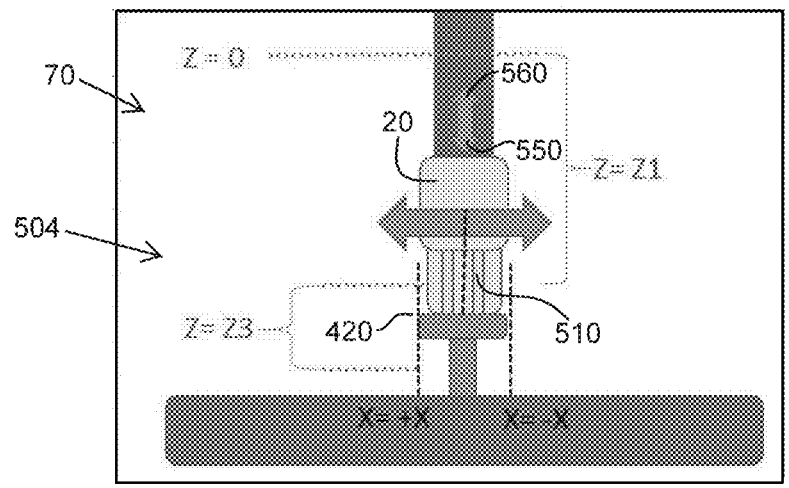
FIG. 34 is a schematic elevation view illustrating the picking and placing gripper of, for example, FIG. 3 lifting the target of, for example, FIG. 24 and thereby confirming a successful lift of the target, according to the principles of the present disclosure.
Figure 35:
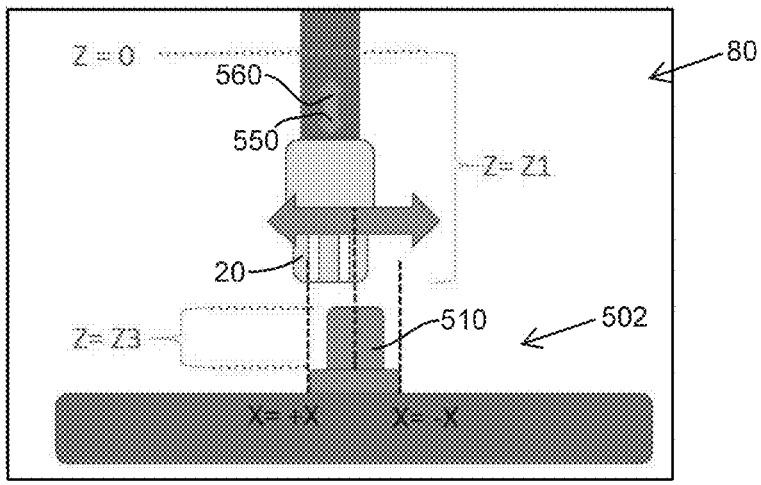
FIG. 35 is a schematic plan view illustrating the target of, for example, FIG. 24 falling down from the picking and placing gripper of, for example, FIG. 3 due to a poor alignment between the target and the gripper, according to the principles of the present disclosure.

To confirm that the positioning mechanism 100 is aligned to the particular target 510, the positioning mechanism 100 will confirm a successful lifting of the target 510 as illustrated at FIGS. 33 and 34. A first target 510 lift attempt may be made using the calculated center 540 determined in the previous step. If this attempt fails, a grid method may be used to find a position that is successful at lifting the target 510. The grid hunting done for this pin lifting test may follow the denser testing grid illustrated at FIG. 30. Upon the target 510 being successfully lifted by the positioning mechanism 100 and, in particular, by the actuator 110 lifting the target 510 via the gripper assembly 20, this test has been successfully completed and may be registered as the new default position $V_D$, $W_D$ for this particular target 510. If all 24 positions illustrated at FIG. 30 are checked and there are no successful pin lifts registered, then the auto align process may abort and an error message may notify the user that the pin 510 could not be lifted by the pick and place unit 100.

Figure 36:
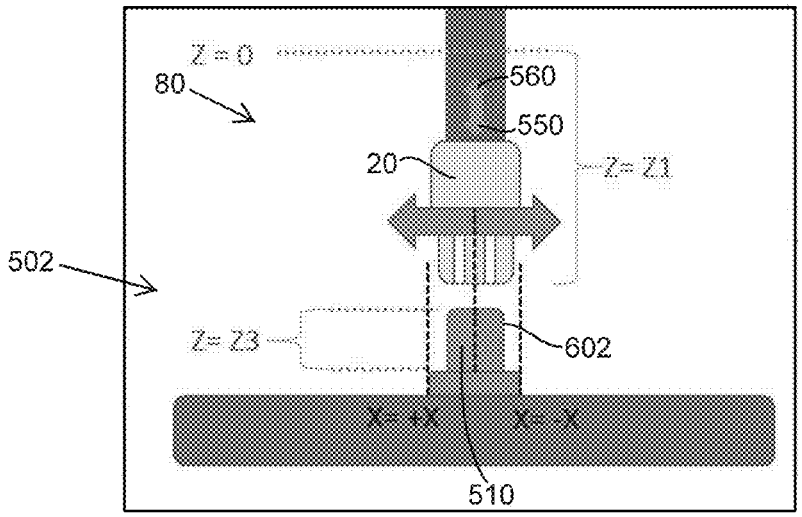
FIG. 36 is a schematic elevation view illustrating the picking and placing gripper of, for example, FIG. 3 positioned above the target of, for example, FIG. 24 in preparation for determining the elevation position of the target, according to the principles of the present disclosure.
Figure 37:
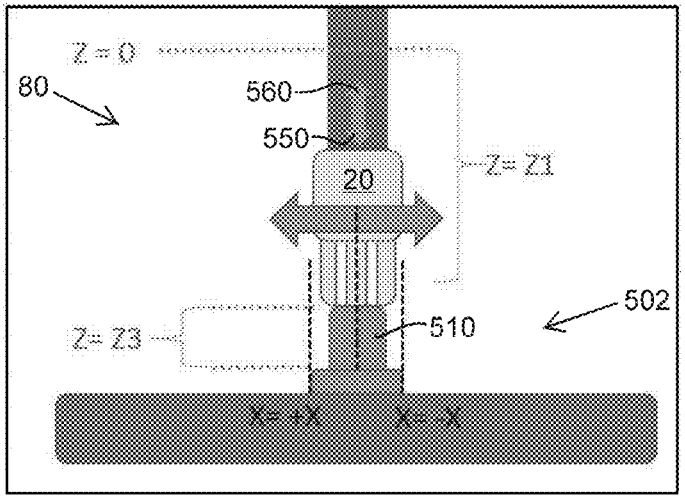
FIG. 37 is a schematic elevation view illustrating an ejector of the picking and placing gripper of, for example, FIG. 3 being actuated and thereby determining the vertical position of the target of, for example, FIG. 24, according to the principles of the present disclosure.

As illustrated at FIGS. 36 and 37, once the center X and Y or α positions are known, then the ejector 260 may be actuated by the piston 24 and the Z-axis moved down using the slippage profile until slippage is recorded. At this point, the Z position may be recorded thereby completing the location detection of the target 510.

A curvilinear method of aligning the gripper assembly 20 and thereby the positioning mechanism 100 (i.e., the pick and place unit) with the intersecting alignment pins 510, 510a, 510b of the various rotational components (i.e., rotational interfacing modules) of the instrument 800 is illustrated at FIG. 38. In this particular example, the gripper assembly 20 is carried along the incubate pick and place unit path 872 (i.e., the pick and place gantry trajectory). The target 510 is carried along the incubate wheel path 882 (i.e., the wheel trajectory, the arc along which the incubate wheel 880 carries the target 510, etc.) which intersects the incubate pick and place unit path 872. A starting search point $960_0$ is initially used to test the alignment, similar to the rectilinear tests, described above. Subsequent search points $960_{1-3}$ are illustrated to show the refinement of the search. The "Fine Edge Search" is used when interfacing module is a wheel and begins at the temporary alignment point $960_0$ which is found at the previous alignment step. After each of the "Fine Edge Search" iterations, a new temporary alignment point $960_{1-3}$ is found (denoted at FIG. 38 as 1, 2, 3), which is used for the starting point during the next iteration. In the depicted embodiment, the process is repeated three times, and that provides a good approximation to align the center of intersection of the gripper assembly 20 with the center of the alignment pin 510.

Figure 39:
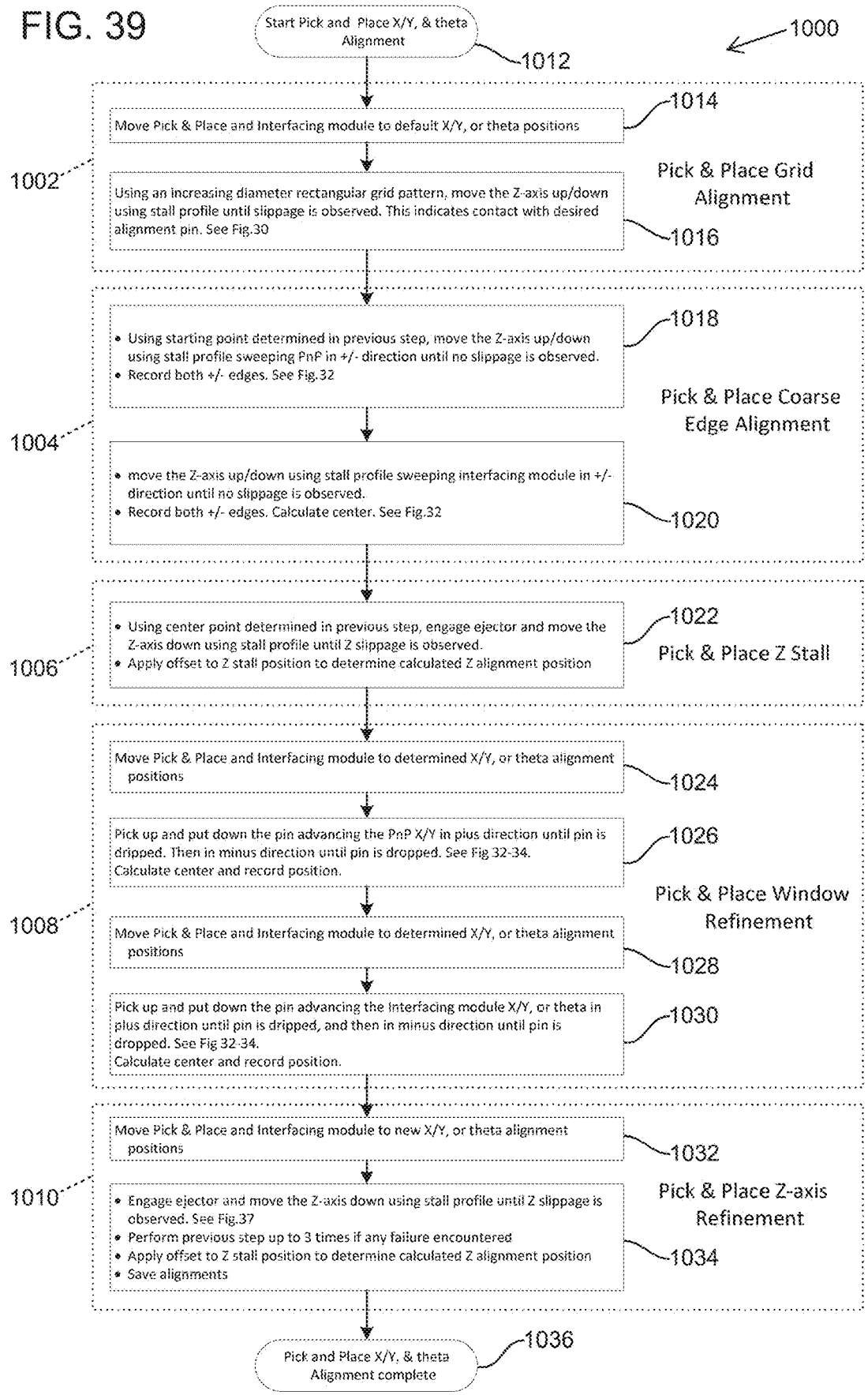
FIG. 39 is a flowchart depicting an exemplary method for aligning the pick and place gripper of, for example, FIG. 3, according to the principles of the present disclosure.

Turning now to FIG. 39, an example flowchart 1000 for aligning an instrument, according to the principles of the present disclosure, will be described. The flowchart 1000 includes five groups, Pick & Place Grid Alignment 1002, Pick & Place Coarse Edge Alignment 1004, Pick & Place Z Stall 1006, Pick & Place Window Refinement 1008, and Pick & Place Z-axis Refinement 1010. The flowchart 1000 begins at "Start Pick and Place X/Y, & theta Alignment" 1012 and advances to "Move Pick & Place and Interfacing module to default X/Y, or theta alignment positions" 1014 of group 1002. Upon performing the functions prescribed, control is advanced to "Using an increasing diameter rectangular grid pattern, move the Z-axis up/down using stall profile until slippage is observed. This indicates contact with desired alignment pin." 1016 of group 1002. Upon performing the functions prescribed, control is advanced to "Using starting point determined in previous step, move the Z-axis up/down using stall profile sweeping PnP in +/−direction until no slippage is observed. Record both +/−edges." 1018 of group 1004. Upon performing the functions prescribed, control is advanced to "Move the Z-axis up/down using stall profile sweeping interfacing module in +/−direction until no slippage is observed. Record both +/−edges. Calculate center." 1020 of group 1004. Upon performing the functions prescribed, control is advanced to "Using center point determined in previous step, engage ejector and move the Z-axis down using stall profile until Z slippage is observed. Apply offset to Z stall position to determine calculated Z alignment position." 1022 of group 1006. Upon performing the functions prescribed, control is advanced to "Move Pick & Place and Interfacing module to determined X/Y, or theta alignment positions." 1024 of group 1008. Upon performing the functions prescribed, control is advanced to "Pick up and put down the pin advancing the PnP X/Y in plus direction until pin is dropped. Then in minus direction until pin is dropped. Calculate center and record position." 1026 of group 1008. Upon performing the functions prescribed, control is advanced to "Move Pick & Place and Interfacing module to determined X/Y, or theta alignment positions." 1028 of group 1008. Upon performing the functions prescribed, control is advanced to "Pick up and put down the pin advancing the Interfacing module X/Y, or theta in plus direction until pin is dropped, and then in minus direction until pin is dropped. Calculate center and record position." 1030 of group 1008. Upon performing the functions prescribed, control is advanced to "Move Pick & Place and Interfacing module to new X/Y, or theta alignment positions." 1032 of group 1010. Upon performing the functions prescribed, control is advanced to "Engage ejector and move the Z-axis down using stall profile until Z slippage is observed. Perform previous step up to 3 times if any failure encountered. Apply offset to z stall position to determine calculated z alignment position. Save alignments." 1034 of group 1010. Upon performing the functions prescribed, the "Pick and Place X/Y, & theta Alignment is complete" 1036.

Figure 40A:
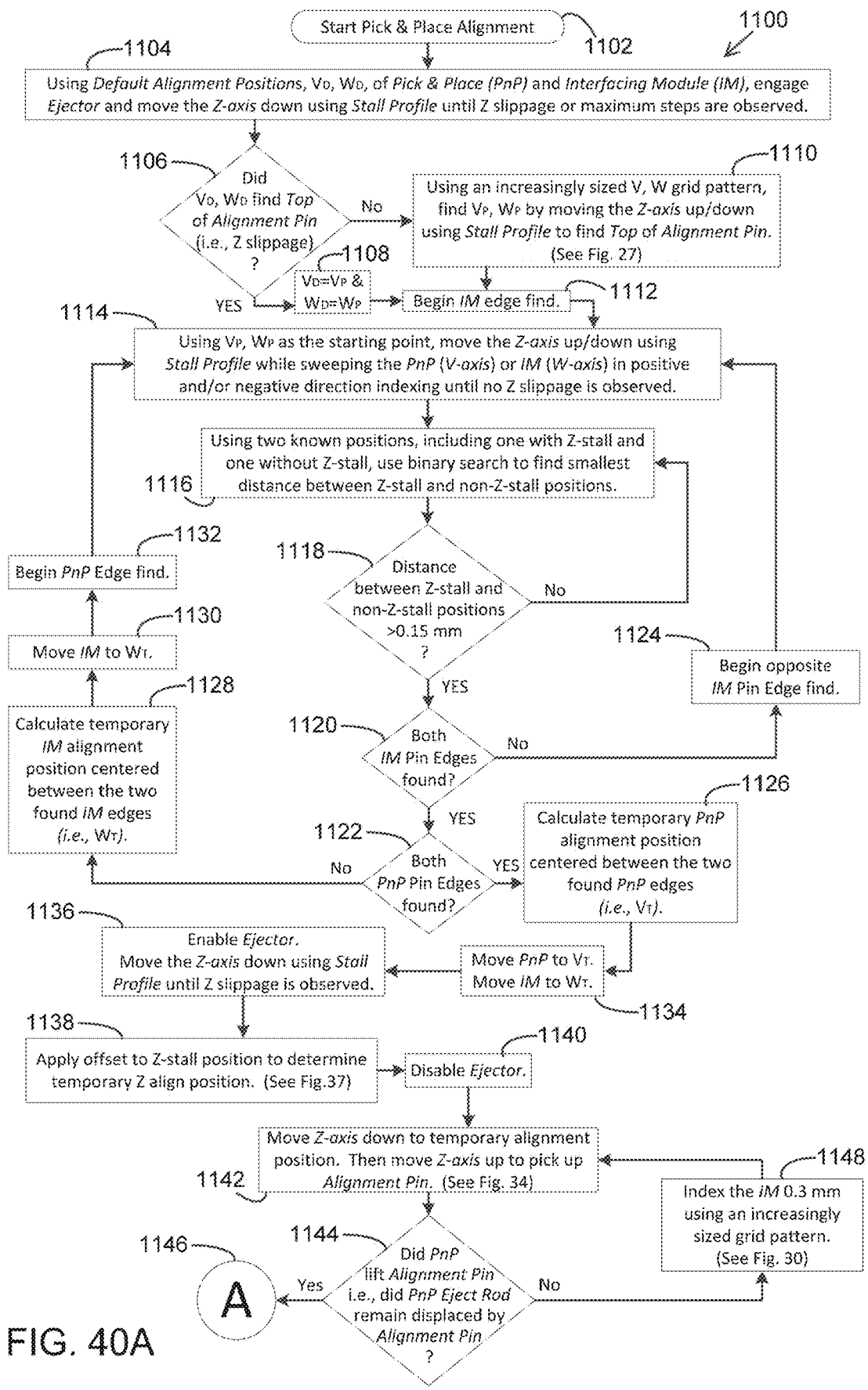
FIGS. 40A and 40B combine to form a flowchart depicting an exemplary method for aligning the pick and place gripper of, for example, FIG. 3, according to the principles of the present disclosure.
Figure 40B:
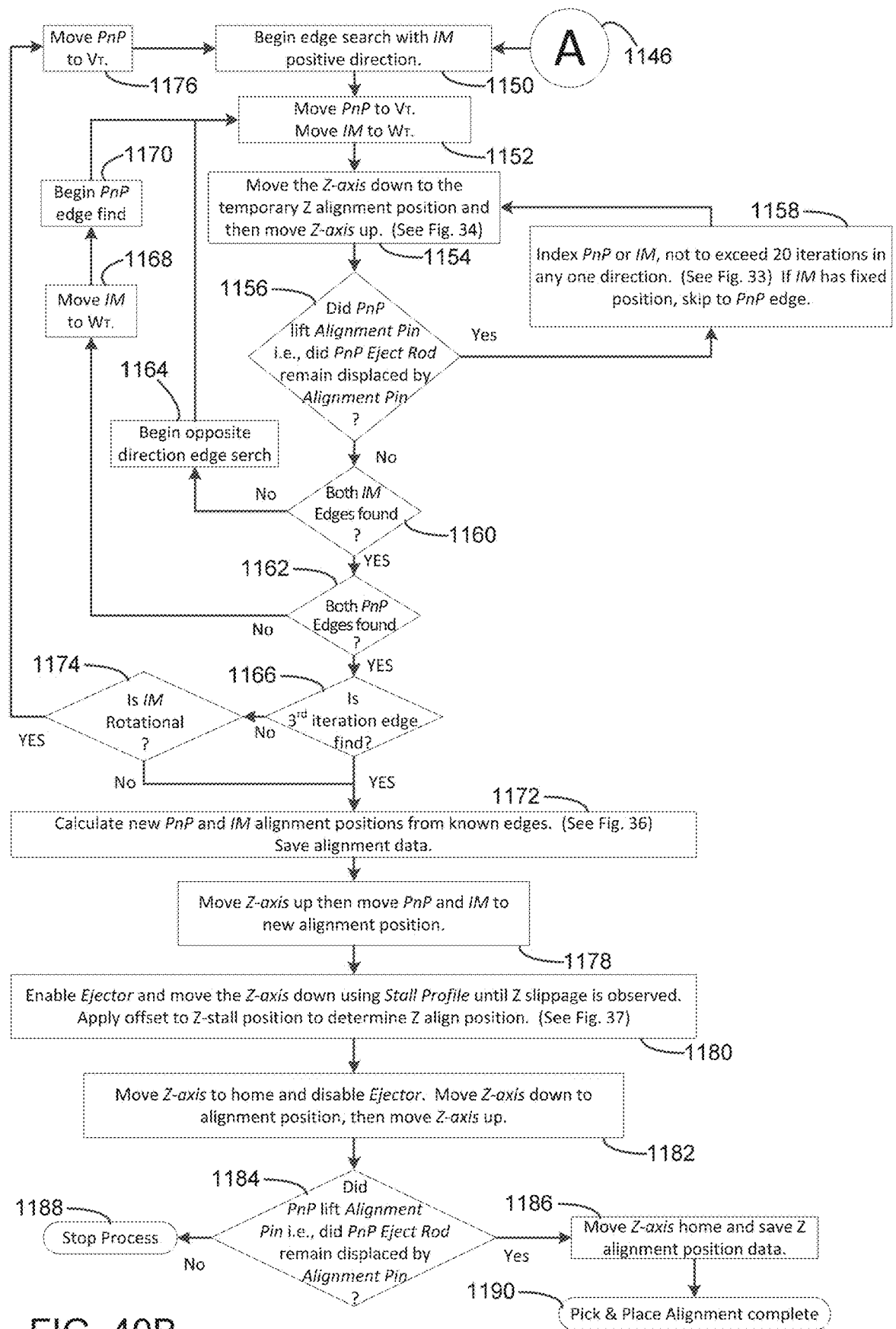

Turning now to FIGS. 40A and 40B, an example flowchart 1100 for aligning an instrument, according to the principles of the present disclosure, will be described. The flowchart 1100 includes seven groups, "Pin Search"—(1104, 1106, 1108, 1110); "Course Pin Edge Search"—(1112, 1114, 1116, 1118, 1120, 1122, 1126, 1128, 1130, 1132); "Top of the Pin Search"—(1134, 1136, 1138); "Search for Pin Pickup Position"—(1140, 1142, 1144, 1148); "Fine Edge Search"—(1150, 1152, 1154, 1156, 1158, 1160, 1162, 1164, 1166, 1168, 1170, 1174, 1176, 1172); "Z Alignment Measurement"—(1178, 1180); and "Alignment Verification"—(1182, 1184, 1186).

It is to be understood that the forms of the system and the steps of the method depicted in the figures have been chosen only for the purpose of describing particular embodiments and functions of the disclosure, and that the arrangements of the disclosure can be addressed in various ways and incorporated in other types of devices and procedures, all of which will be evident to those working in the art. It is to be understood that the particular arrangement or operation of the gripper assembly 20 of the present disclosure may vary depending on the automated analyzer that it is incorporated or working together with, but that the determination of necessary variation is well within the skill in the art in view of the present disclosure. The present disclosure may be embodied in other specific forms without departing from its essential characteristics. The described embodiment is to be considered in all respects only as illustrative and not as restrictive. The scope of the disclosure is, therefore, indicated by the appended claims rather than by the foregoing description. All changes which come within the meaning and range of the equivalence of the claims are to be embraced within their scope.

What is claimed is:

1. A method of aligning a pick and place unit and a target, the method comprising:
   a. providing the pick and place unit with a gripper assembly configured to move in a lateral direction and a vertical direction that is perpendicular to the lateral direction;
   b. moving the gripper assembly in the vertical direction toward a first predetermined position with at least a first actuator, the first actuator comprising a stepper motor and an encoder;
   c. determining if the target is located proximate the first predetermined position by performing acts comprising:
      i. monitoring the first actuator for a first stalled position while moving the gripper assembly in the vertical direction, the first stalled position being detected by determining a slippage between the stepper motor and the encoder of the first actuator while moving the gripper assembly in the vertical direction
      ii. determining if a presence of the target was detected or not detected by analyzing the first stalled position, wherein:
         A. determining the target is present by detecting the slippage of the first stalled position is in a predetermined range, indicating the gripper assembly made physical contact with the target; and
         B. determining the target is not present by detecting the slippage of the first stalled position is not in the predetermined range, indicating the gripper assembly missed the target;

d. if the presence of the target was not detected at the first predetermined position based on the first stalled position, then:
  i. moving the gripper assembly toward a second predetermined position with at least the first actuator and a second actuator, the second predetermined position being offset in the lateral direction from the first predetermined position, the moving of the gripper assembly toward the second predetermined position including movement in the lateral direction by the second actuator and movement in the vertical direction by the first actuator;
  ii. while moving the gripper assembly in the vertical direction toward the second predetermined position, monitoring the first actuator for stalling;
  iii. determining a second stalled position of the gripper assembly when the first actuator stalls while moving the gripper assembly in the vertical direction and toward the second predetermined position; and
  iv. determining if the presence of the target was detected or not detected by analyzing the second stalled position of the gripper assembly, wherein determining slippage between the stepper motor and the encoder comprises comparing a difference reported by the stepper motor and the encode.

2. The method of claim 1, wherein the gripper assembly includes a collet, wherein the target includes a pin, and wherein the collet is configured to hold the pin by friction when the collet engages the pin.

3. The method of claim 1, further comprising if the presence of the target was not detected based on the second stalled position, then repeating step d. with moving the gripper assembly toward subsequent predetermined positions and with determining subsequent stalled positions until the presence of the target is detected.

4. The method of claim 3, wherein repeating step d. includes grid hunting.

5. The method of claim 4, wherein grid hunting includes moving the gripper assembly toward the subsequent predetermined positions with at least the first actuator, the second actuator, and a third actuator.

6. The method of claim 5, wherein the first actuator and the second actuator actuate the pick and place unit.

7. The method of claim 6, wherein the third actuator actuates the target.

8. The method of claim 1, further comprising upon detecting the presence of the target, determining edges of the target.

9. The method of claim 8, wherein determining the edges of the target includes:
  moving the gripper assembly in an engaging direction and in an opposite disengaging direction with the first actuator while incrementing positions of the gripper assembly about the target with at least a second actuator and thereby determining at least a first edge portion and a second edge portion opposite each other about the target; and
  monitoring the first actuator for stalling while moving the gripper assembly in the engaging direction.

10. The method of claim 9, wherein determining the edges of the target further includes incrementing positions of the gripper assembly about the target with at least the second actuator and a third actuator and thereby further determining at least a third edge portion and a fourth edge portion opposite each other about the target.

11. The method of claim 10, wherein the first edge portion and the second edge portion are opposite each other about the target along a first direction, wherein the third edge portion and the fourth edge portion are opposite each other about the target along a second direction.

12. The method of claim 11, wherein the first direction and the second direction are orthogonal to each other.

13. The method of claim 8, further comprising calculating a center of the target by analyzing the edges of the target.

14. The method of claim 13, further comprising:
  moving the gripper assembly into alignment with the center of the target;
  engaging the gripper assembly and the target by positioning the gripper assembly over the target and thereby holding the target with the gripper assembly by friction; and
  attempting to move the target with the gripper assembly.

15. The method of claim 14, further comprising:
  if the attempt to move the target was not successful, then:
    repeating moving the gripper assembly into alignment with the center of the target with grid hunting;
    repeating engaging the gripper assembly and the target by positioning the gripper assembly over the target and thereby holding the target with the gripper assembly by friction; and
    repeating attempting to move the target with the gripper assembly.

16. The method of claim 15, further comprising:
  retrieving stored coordinates of the first predetermined position corresponding to the target and/or the target from a storage location for use in moving the gripper assembly toward the first predetermined position;
  upon confirming alignment of the pick and place unit and the target, calculating a current position of the target;
  upon the current position of the target being different from a former position of the target indicated by the retrieved stored coordinates, storing current coordinates of the target and/or storing updated coordinates corresponding to the first predetermined position to the storage location for next use in moving the gripper assembly toward the first predetermined position.

17. The method of claim 16, wherein the target is a first target of a plurality of targets, the method further comprising:
  moving the gripper assembly toward a predetermined position corresponding to a second target of the plurality of targets with at least the first actuator;
  monitoring the first actuator for stalling while moving the gripper assembly toward the predetermined position corresponding to the second target;
  determining a stalled position of the gripper assembly corresponding to the second target when the first actuator stalls; and
  determining if a presence of the second target was detected or not detected by analyzing the stalled position of the gripper assembly corresponding to the second target.

18. The method of claim 17, further comprising upon detecting the presence of the second target, determining edges of the second target.

19. A method of aligning a pick and place unit and a target, the method comprising:
  a. providing the pick and place unit with a gripper assembly;
  b. moving the gripper assembly in a downward direction toward a first predetermined position with at least a first actuator, the first actuator comprising a stepper motor and an encoder;

c. monitoring the first actuator for stalling while moving the gripper assembly toward the first predetermined position;
d. determining a first stalled position of the gripper assembly when the first actuator stalls;
e. determining if a presence of the target was detected or not detected by analyzing the first stalled position of the gripper assembly;
f. if the presence of the target was not detected, then moving the gripper assembly toward a second predetermined position with at least the first actuator and a second actuator;
g. monitoring the first actuator for stalling while moving the gripper assembly toward the second predetermined position;
h. determining a second stalled position of the gripper assembly when the first actuator stalls; and
i. determining if the presence of the target was detected or not detected by analyzing the second stalled position of the gripper assembly,
wherein determining the first stalled position or the second stalled position comprises determining slippage between the stepper motor and the encoder by comparing a difference reported by the stepper motor and the encoder, the stepper motor being configured to step to a commanded position, and
wherein the step of determining if a presence of the target is not detected occurs when the slippage is outside of a predetermined range.

20. A method of aligning a pick and place unit and a target, the target defining a target axis, the method comprising:
a. providing the pick and place unit with a gripper assembly defining a gripper axis which is parallel to the target axis;
b. moving the gripper assembly along the gripper axis using a first actuator while comparing feedback from a stepper and an encoder of the first actuator to detect slippage;
c. detecting slippage based on the comparison;
d. when slippage is detected, determining one of the following based on a position of the gripper assembly when slippage was detected:
  i. determining that the gripper assembly has contacted the target and that the target axis is not colinear to the gripper axis; and
  ii. determining that the gripper assembly has not contacted the target; and
e. repeating the following steps until determining that the gripper axis and the target axis are colinear based on a position of the gripper assembly:
  i. steps b-c; and
  ii. moving the gripper assembly in a direction perpendicular to the gripper axis.

* * * * *